(12) United States Patent
Kim et al.

(10) Patent No.: US 11,557,230 B2
(45) Date of Patent: Jan. 17, 2023

(54) ELECTRONIC DEVICE

(71) Applicant: Samsung Display Co., Ltd., Yongin-si (KR)

(72) Inventors: Jinhyoung Kim, Seoul (KR); Yunjae Kim, Cheonan-si (KR); Jin Yong Sim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 89 days.

(21) Appl. No.: 17/128,162

(22) Filed: Dec. 20, 2020

(65) Prior Publication Data

US 2021/0256882 A1 Aug. 19, 2021

(30) Foreign Application Priority Data

Feb. 14, 2020 (KR) .......................... 10-2020-0018620
Apr. 24, 2020 (KR) .......................... 10-2020-0050006

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1656* (2013.01)

(58) Field of Classification Search
CPC .............................. G06F 1/1652; G06F 1/1686
See application file for complete search history.

(56) References Cited

U.S. PATENT DOCUMENTS

| | | | | |
|---|---|---|---|---|
| 9,740,318 B2* | 8/2017 | Han | ...................... | G06F 3/0446 |
| 10,368,452 B2 | 7/2019 | Yun et al. | | |
| 2014/0184521 A1* | 7/2014 | Kwong | ................... | G03B 17/12 |
| | | | | 345/173 |
| 2016/0026219 A1* | 1/2016 | Kim | ...................... | G06F 1/1641 |
| | | | | 345/173 |
| 2016/0328064 A1* | 11/2016 | Han | ...................... | G06F 3/0412 |
| 2017/0287992 A1* | 10/2017 | Kwak | ................. | H04M 1/0264 |
| 2017/0289324 A1 | 10/2017 | Yeo et al. | | |
| 2019/0245958 A1* | 8/2019 | Cheng | ................... | G06F 1/1656 |
| 2019/0306295 A1 | 10/2019 | Cheng | | |
| 2019/0361502 A1* | 11/2019 | Bai | ...................... | G06F 1/1652 |
| 2021/0256882 A1 | 8/2021 | Kim et al. | | |
| 2021/0384476 A1* | 12/2021 | Sim | ......................... | H01L 51/56 |
| 2022/0139274 A1* | 5/2022 | Sim | ...................... | H01L 51/5246 |
| | | | | 361/679.01 |

FOREIGN PATENT DOCUMENTS

| | | |
|---|---|---|
| KR | 10-2017-0111827 | 10/2017 |
| KR | 10-2018-0079016 | 7/2018 |
| KR | 10-2021-0104517 | 8/2021 |

* cited by examiner

*Primary Examiner* — Adrian S Wilson
(74) *Attorney, Agent, or Firm* — H.C. Park & Associates, PLC

(57) ABSTRACT

An electronic device includes a display panel, a cushion member disposed below the display panel, an electronic module inserted into a hole defined by the display panel and the cushion member, and a light blocking pattern disposed on the electronic module with the display panel therebetween. The electronic module is spaced apart from a sidewall configured to define the hole in a first state in which the display panel and the cushion member are folded and a second state in which the display panel and the cushion member are unfolded.

19 Claims, 14 Drawing Sheets

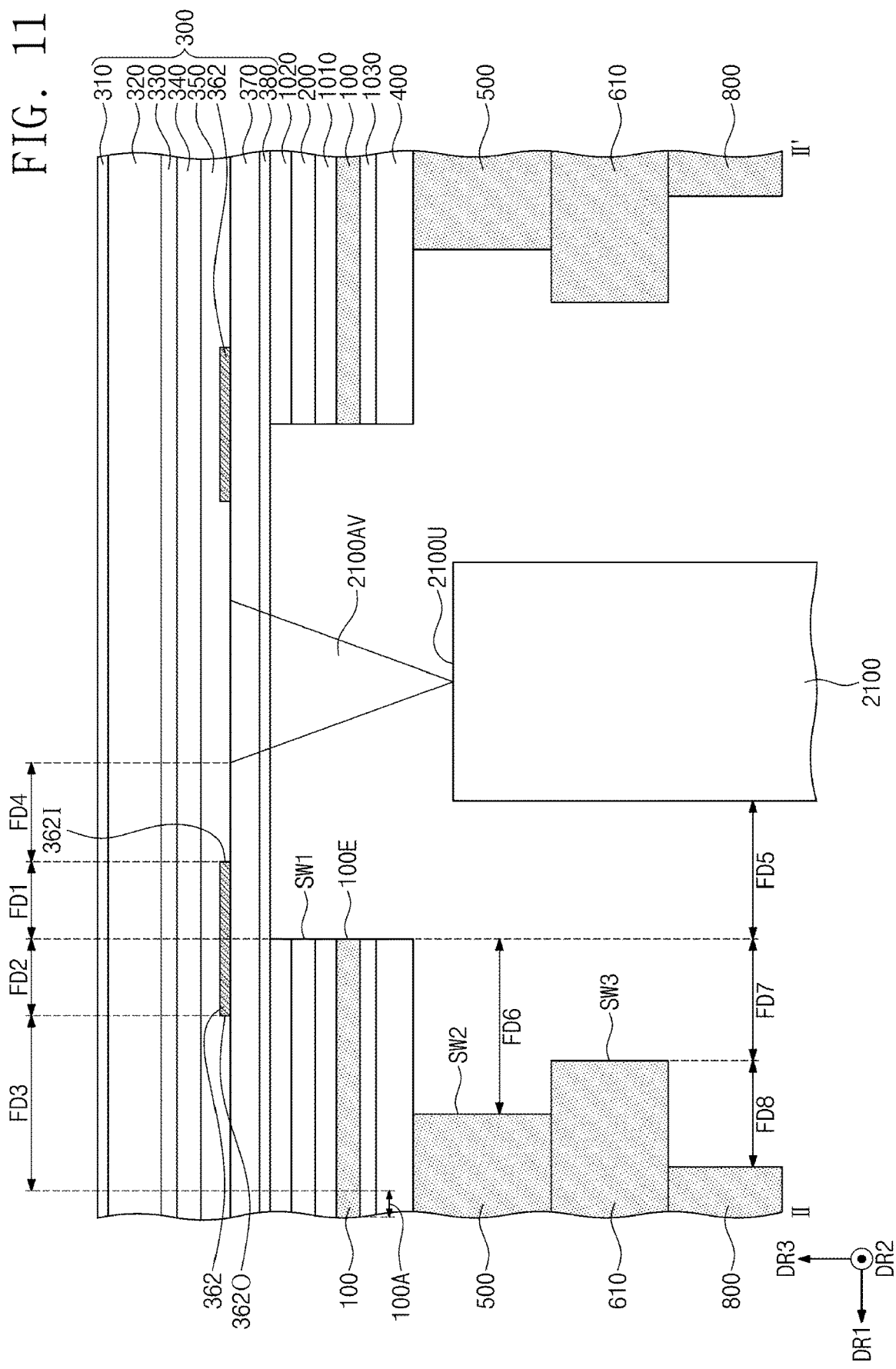

ELECTRONIC DEVICE

CROSS-REFERENCE TO RELATED APPLICATIONS

This application claims priority from and the benefit of Korean Patent Application Nos. 10-2020-0018620, filed on Feb. 14, 2020, and 10-2020-0050006, filed on Apr. 24, 2020, which is hereby incorporated by reference for all purposes as if fully set forth herein.

BACKGROUND

Field

Exemplary embodiments of the invention relate generally to a foldable electronic device.

Discussion of the Background

An electronic device typically includes an active area that is activated according to an electrical signal. The electronic device detects an input that is applied from the outside through the active area and simultaneously displays various images to provide information to a user. In recent years, as electronic devices having various shapes have been developed, active areas having various shapes have been used.

The above information disclosed in this Background section is only for understanding of the background of the inventive concepts, and, therefore, it may contain information that does not constitute prior art.

SUMMARY

Devices constructed according to exemplary embodiments of the invention are capable of providing an electronic device in which an active area is expanded in area.

Devices constructed according to exemplary embodiments of the invention are also capable of providing an electronic device having improved product reliability.

Additional features of the inventive concepts will be set forth in the description which follows, and in part will be apparent from the description, or may be learned by practice of the inventive concepts.

One or more exemplary embodiments of the inventive concepts provide an electronic device including: a display panel; a cushion member disposed below the display panel; an electronic module inserted into a hole defined by the display panel and the cushion member; and a light blocking pattern disposed on the electronic module with the display panel therebetween, wherein the electronic module is spaced apart from a sidewall configured to define the hole in a first state in which the display panel and the cushion member are folded and a second state in which the display panel and the cushion member are unfolded.

In an embodiment, the light blocking pattern may be spaced apart from a viewing angle area of the electronic module in the first state and the second state.

In an embodiment, the hole may include a first hole portion defined in the display panel and a second hole portion defined in the cushion member, and the second hole portion may have a width greater than that of the first hole portion.

In an embodiment, when viewed on a plane, the light blocking pattern may overlap a sidewall of the display panel, which defines the first hole portion.

In an embodiment, when viewed on a plane, a sidewall of the cushion member, which defines the second hole portion, may surround the light blocking pattern.

In an embodiment, a sidewall of the cushion member, which defines the second hole portion, may not overlap the light blocking pattern.

In an embodiment, a plate may be disposed below the cushion member, wherein a third hole portion having a width greater than that of the first hole portion and less than that of the second hole portion may be defined in the plate, and the first hole portion, the second hole portion, and the third hole portion may overlap each other to define the hole.

In an embodiment, the light blocking pattern may have a ring shape with an inner diameter and an outer diameter surrounding the inner diameter, and the inner diameter may be less than the first hole portion, and the outer diameter may be greater than the first hole portion.

In an embodiment, a first distance between the inner diameter and an edge of the display panel, which defines the first hole portion, may be different from a second distance between the outer diameter and the edge of the display panel, which defines the first hole portion.

In an embodiment, the first distance may be greater than the second distance.

In an embodiment, each of the first distance and the second distance may be determined based on component tolerances, equipment tolerances, and folding tolerances.

In an embodiment, the electronic device may include an impact absorbing layer disposed on the display panel and a hard coating layer disposed between the impact absorbing layer and the display panel, wherein a portion of the hard coating layer may be exposed through the hole.

In an embodiment, the impact absorbing layer may include a stretched film of which an optical axis is controlled.

In an embodiment, the electronic device may include a window disposed on the light blocking pattern and a protective layer disposed on the window, wherein a sidewall of the protective layer may further protrude from a sidewall of the window.

In an embodiment, a distance between the window and the electronic module may be about 60% or more of total sum of thicknesses of components, each of which has a modulus equal to or less than a reference modulus, among components in which the hole is defined.

In an embodiment, the reference modulus may be about 50 MPa or less.

One or more exemplary embodiments of the inventive concepts provides an electronic device that includes: a display panel; an electronic module disposed to overlap a hole defined in the display panel; and a light blocking pattern having a ring shape disposed on the electronic module with the display panel therebetween and having an inner diameter and an outer diameter surrounding the inner diameter, wherein a first distance between the inner diameter and an edge of the display panel, which defines the hole, is different from a second distance between the outer diameter and the edge of the display panel, which defines the hole.

In an embodiment, the first distance may be greater than the second distance.

In an embodiment, each of the first distance and the second distance may be determined based on component tolerances, equipment tolerances, and folding tolerances.

In an embodiment, in a first state, in which the display panel is folded, and a second state, in which the display panel is unfolded, the electronic module may be spaced apart from the edge of the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification. The drawings illustrate example embodiments of the inventive concepts and, together with the description, serve to explain principles of the inventive concepts.

FIG. 11 is a cross-sectional view for explaining design dimensions of the electronic device according to an embodiment of the inventive concepts.

DETAILED DESCRIPTION

Figure 1A:
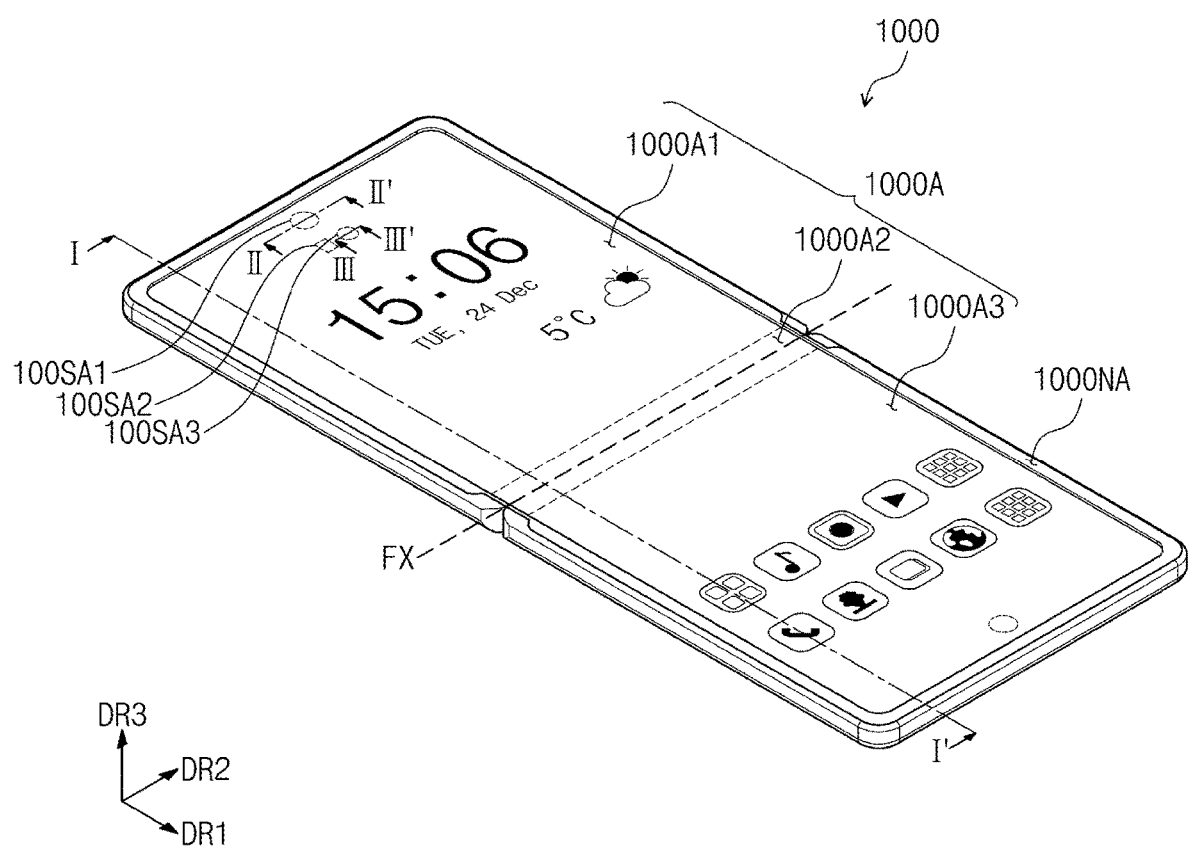
FIG. 1A is a perspective view of an electronic device according to an embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly. As used herein, "viewed on a plane" refers to a plan view from a direction normal to recited layers and/or substrates.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, example (i.e., "exemplary") embodiments of the inventive concepts will be described with reference to the accompanying drawings.

Figure 1B:
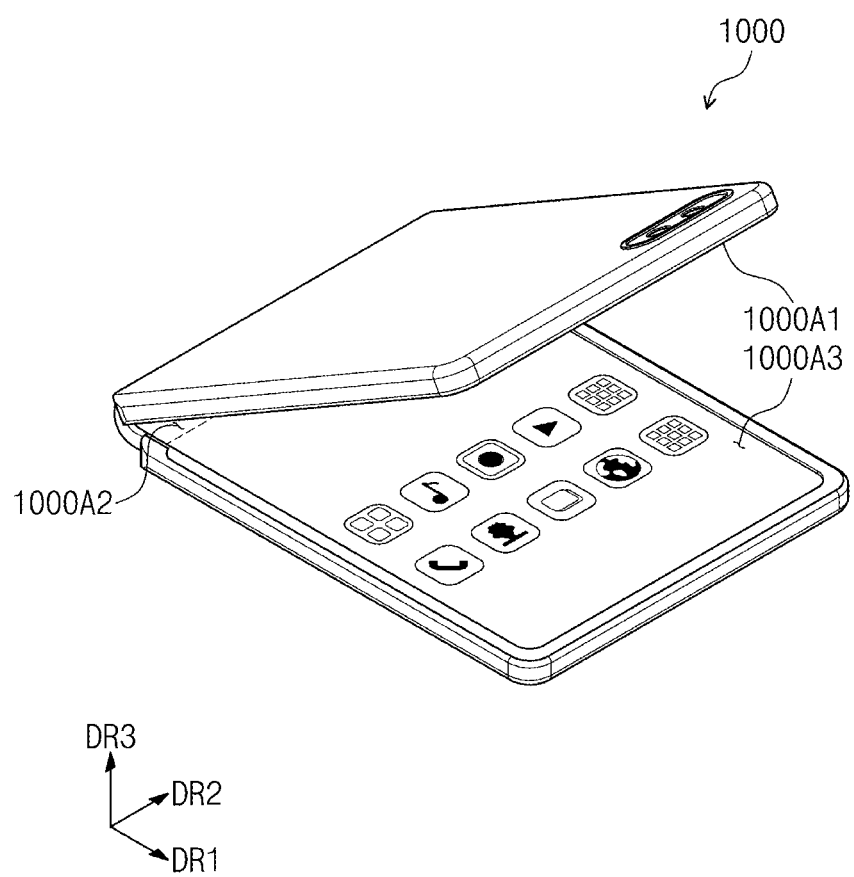
FIG. 1B is a perspective view of an electronic device according to an embodiment of the inventive concepts.

FIG. 1A is a perspective view of an electronic device according to an embodiment of the inventive concepts. FIG. 1B is a perspective view of an electronic device according to an embodiment of the inventive concepts. FIG. 1A illustrates an unfolded state of an electronic device 1000, and FIG. 1B illustrates a folded state of the electronic device 1000.

Referring to FIGS. 1A and 1B, the electronic device 1000 may be a device that is activated according to an electrical signal. For example, the electronic device 1000 may be a mobile phone, a tablet PC, a car navigation system, a game console, or a wearable device, but is not limited thereto. FIG. 1A illustrates an example in which the electronic device 1000 is in the form of a mobile phone.

The electronic device 1000 may display an image through an active area 1000A. In a state in which the electronic device 1000 is unfolded, the active area 1000A may include a plane defined by a first direction DR1 and a second direction DR2. A thickness direction of the electronic device 1000 may be parallel to a third direction DR3 crossing the first direction DR1 and the second direction DR2. Thus, a front surface (or top surface) and a rear surface (or bottom surface) of each of members constituting the electronic device 1000 may be defined based on the third direction DR3.

The active area 1000A may include a first area 1000A1, a second area 1000A2, and a third area 1000A3. The second area 1000A2 may be bent with respect to a folding axis FX extending along the second direction DR2. Thus, the first area 1000A1 and the third area 1000A3 may be referred to as non-folding areas, and the second area 1000A2 may be referred to as a folding area.

When the electronic device 1000 is folded, the first area 1000A1 and the third area 1000A3 may face each other. Thus, in the fully folded state, the active area 1000A may not be exposed to the outside, which may be referred to as in-folding. However, this is merely an example, and an operation of the electronic device 1000 is not limited thereto.

For example, in an embodiment of the inventive concepts, when the electronic device 1000 is folded, the first area 1000A1 and the third area 1000A3 may be opposite to each other. Thus, in the folded state, the active area 1000A may be exposed to the outside, which may be referred to as out-folding.

The electronic device 1000 may perform only one operation of the in-folding and the out-folding. Alternatively, the electronic device 1000 may perform all the operations of the in-folding and the out-folding. In this case, the same area of the electronic device 1000, for example, the second area 1000A2 may be in-folded and out-folded. Alternatively, one area of the electronic device 1000 may be in-folded, and the other area may be out-folded.

FIGS. 1A and 1B, one folding area and two non-folding areas are illustrated as an example, but the number of folding and non-folding areas is not limited thereto. For example, the electronic device 1000 may include more than two folding areas, i.e., a plurality of non-folding areas and a plurality of folding areas disposed between the non-folding areas adjacent to each other.

FIGS. 1A and 1B illustrate that the folding axis FX is parallel to a short axis of the electronic device 1000 in a second direction DR2, but embodiments of the inventive concepts are not limited thereto. For example, the folding axis FX may extend along a long axis of the electronic device 1000, for example, in a direction parallel to the first direction DR1. In this case, the first area 1000A1, the second area 1000A2, and the third area 1000A3 may be sequentially arranged along the second direction DR2.

A plurality of sensing areas 100SA1, 100SA2, and 100SA3 may be defined on the electronic device 1000. In FIG. 1A, the three sensing areas 100SA1, 100SA2, and 100SA3 are exemplarily illustrated, but the number of plurality of sensing areas 100SA1, 100SA2, and 100SA3 is not limited thereto.

The plurality of sensing areas 100SA1, 100SA2, and 100SA3 may include a first sensing area 100SA1, a second sensing area 100SA2, and a third sensing area 100SA3. For example, the first sensing area 100SA1 may overlap a camera module, and the second sensing area 100SA2 and the third sensing area 100SA3 may overlap a proximity illumination sensor, but is not limited thereto.

Each of a plurality of electronic modules 2000 (see FIG. 4) may receive an external input transmitted through the first sensing area 100SA1, the second sensing area 100SA2, or the third sensing area 100SA3 or may provide an output through the first sensing area 100SA1, the second sensing area 100SA2, or the third sensing area 100SA3.

The first sensing area 100SA1 may be surrounded by the active area 1000A, and the second sensing area 100SA2 and the third sensing area 100SA3 may be included in the active area 1000A. That is, the second sensing area 100SA2 and the third sensing area 100SA3 may display an image. Each of the first sensing area 100SA1, the second sensing area 100SA2, and the third sensing area 100SA3 may have transmittance greater than that of the active area 1000A. Also, the first sensing area 100SA1 may have transmittance greater than each of those of the second sensing area 100SA2 and the third sensing area 100SA3.

According to an embodiment of the inventive concepts, a portion of the plurality of electronic modules 2000 (see FIG. 4) may overlap the active area 1000A, and the other portion of the plurality of electronic modules 2000 (see FIG. 4) may be surrounded by the active area 1000A. Thus, it is unnecessary to provide an area, on which the plurality of electronic modules 2000 (see FIG. 4) are disposed, to a peripheral area 1000NA around the active area 1000A. As a result, an area ratio of the active area 1000A to the front surface of the electronic device 1000 may increase.

Figure 2:
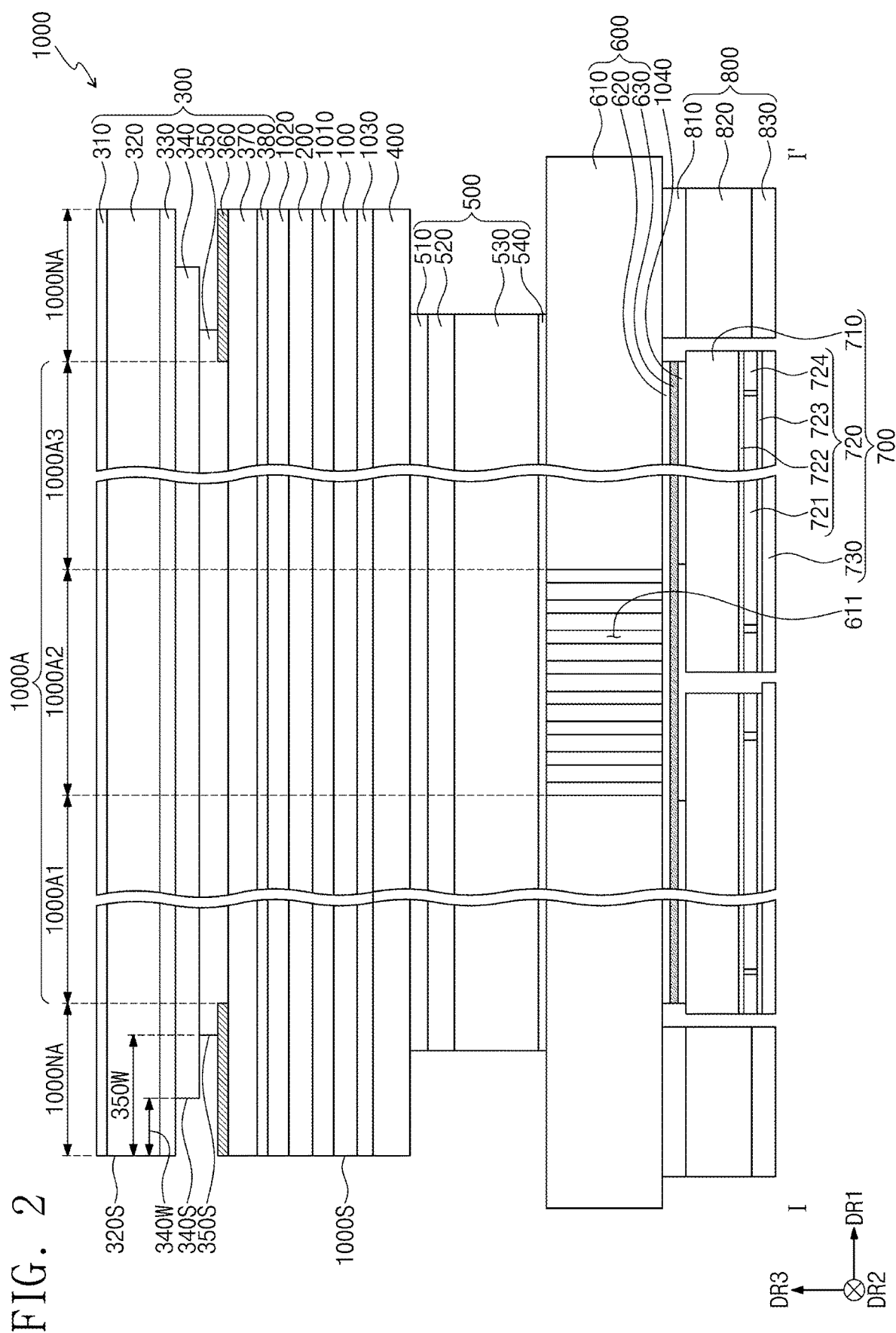
FIG. 2 is a cross-sectional view of the electronic device, taken along line I-I' of FIG. 1A, according to an embodiment of the inventive concepts.
Figure 3A:
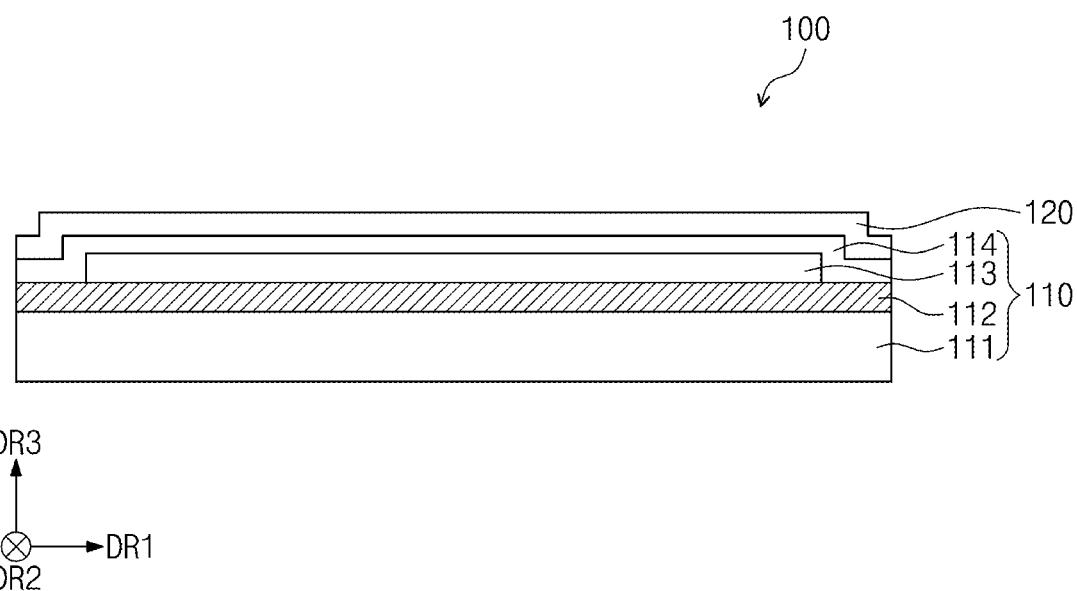
FIG. 3A is a cross-sectional view of a display panel according to an embodiment of the inventive concepts.

FIG. 2 is a cross-sectional view of the electronic device, taken along line I-I' of FIG. 1A, according to an embodiment of the inventive concepts. FIG. 3A is a cross-sectional view of a display panel according to an embodiment of the inventive concepts.

Referring to FIG. 2, the electronic device 1000 may include a display panel 100, upper functional layers, and lower functional layers.

Referring to FIG. 3A, the display panel 100 may be configured to generate an image and sense an input applied from the outside. For example, the display panel 100 may include a display layer 110 and a sensor layer 120. The display panel 100 may have a thickness of about 25 micrometers to about 35 micrometers, for example, about 30 micrometers, and the thickness of the display panel 100 is not limited thereto.

The display layer 110 may be configured to substantially generate an image. The display layer 110 may be an emission-type display layer, for example, the display layer 110 may be an organic light emitting display layer, a quantum dot display layer, or a micro LED display layer.

The display layer 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layered structure. For example, the base layer 111 may have a three-layered structure constituted by a synthetic resin layer, an adhesive layer, and a synthetic resin layer. Particularly, the synthetic resin layer may be a polyimide resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, or a perylene-based resin. In addition, the base layer 111 may include a glass substrate or an organic/inorganic composite substrate.

The circuit layer 112 may be disposed on the base layer 111. The circuit layer 112 may include an insulation layer, a semiconductor pattern, a conductive pattern, and a signal line. The insulating layer, the semiconductor layer, and the conductive layer may be formed on the base layer 111 in a manner such as coating or vapor deposition, and then, the insulating layer, the semiconductor layer, and the conductive layer may be selectively patterned through a plurality of photolithography processes. Thereafter, the semiconductor pattern, the conductive pattern, and the signal line included in the circuit layer 112 may be formed.

The light emitting element layer 113 may be disposed on the circuit layer 112. The light emitting element layer 113 may include a light emitting element. For example, the light emitting element layer 113 may include an organic light emitting material, quantum dots, quantum rods, or micro LEDs.

The encapsulation layer 114 may be disposed on the light emitting element layer 113. The encapsulation layer 114 may include an inorganic layer, an organic layer, and an inorganic layer, which are sequentially laminated, but layers constituting the encapsulation layer 114 are not limited thereto.

The inorganic layers may protect the light emitting element layer 113 against moisture and oxygen, and the organic layer may protect the light emitting element layer 113 against foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but embodiments of the inventive concepts are not limited thereto.

The sensor layer 120 may be disposed on the display layer 110. The sensor layer 120 may sense an external input applied from the outside. The external input may be a user's input. The user's input may include various types of external inputs such as a portion of user's body, light, heat, a pen, a pressure, or the like.

The sensor layer 120 may be disposed on the display layer 110 through a continuous process. In this case, the sensor layer 120 may be expressed as being directly disposed on the display layer 110. The direct disposition may mean that a third component is not disposed between the sensor layer 120 and the display layer 110. That is, a separate adhesive member may not be disposed between the sensor layer 120 and the display layer 110.

Alternatively, the sensor layer 120 may be bonded to the display layer 110 through an adhesive member. The adhesive member may include a common adhesive or an adhesive agent.

Referring again to FIG. 2, the upper functional layers may be disposed on the display panel 100. For example, the upper functional layers may include an anti-reflection member 200 and an upper member 300.

The anti-reflection member 200 may be referred to as an anti-reflection layer. The anti-reflection member 200 may reduce reflectance of external light incident from the outside. The anti-reflection member 200 may include a stretched synthetic resin film. For example, the anti-reflection member 200 may be provided by dyeing an iodine compound on a polyvinyl alcohol film (PVA film). However, this is merely an example, and the material constituting the anti-reflection member 200 is not limited thereto. The anti-reflection member 200 may have a thickness of about 25 micrometers to about 35 micrometers, for example, about 31 micrometers, and the thickness of the anti-reflection member 200 is not limited thereto.

The anti-reflection member 200 may be bonded to the display panel 100 through a first adhesive layer 1010. The first adhesive layer 1010 may be a transparent adhesive layer such as a pressure sensitive adhesive film (PSA), an optically clear adhesive film (OCA), or an optically clear resin (OCR). Hereinafter, the adhesive member may include a general adhesive or adhesive agent. The first adhesive layer 1010 may have a thickness of about 20 micrometers to about 30 micrometers, for example, about 25 micrometers, and the thickness of the first adhesive layer 1010 is not limited thereto.

In an embodiment of the inventive concepts, the first adhesive layer 1010 may be omitted. In this case, the anti-reflection member 200 may be directly disposed on the display panel 100. In the case, a separate adhesive layer may not be disposed between the anti-reflection member 200 and the display panel 100.

The upper member 300 may be disposed on the anti-reflection member 200. The upper member 300 includes a first hard coating layer 310, a protective layer 320, a first upper adhesive layer 330, a window 340, a second upper adhesive layer 350, a light blocking layer 360, an impact absorbing layer 370, and a second hard coating layer 380. The components included in the upper member 300 are not limited to the components described above. At least a portion of the above-described components may be omitted, and other components may be added.

The first hard coating layer 310 may be a layer disposed on the outermost surface of the electronic device 1000. The first hard coating layer 310 may be a functional layer for improving use characteristics of the electronic device 1000 and may be applied on the protective layer 320. For example, anti-fingerprint properties, anti-pollution properties, and anti-scratch properties may be improved by the first hard coating layer 310.

The protective layer 320 may be disposed below the first hard coating layer 310. The protective layer 320 may protect constituents disposed below the protective layer 320. The first hard coating layer 310, the anti-fingerprint layer, and the like may be additionally provided on the protective layer 320 to improve properties such as chemical resistance and abrasion resistance. The protective layer 320 may include a film having an elastic modulus of about 15 GPa or less at room temperature. The protective layer 320 may have a thickness of about 50 micrometers to about 60 micrometers, for example, about 55 micrometers, but the thickness of the protective layer 320 is not limited thereto. In an embodiment, the protective layer 320 may be omitted.

The first upper adhesive layer 330 may be disposed below the protective layer 320. The protective layer 320 and the window 340 may be bonded to each other by the first upper adhesive layer 330. The first upper adhesive layer 330 may have a thickness of about 20 micrometers to about 30 micrometers, for example, about 25 micrometers, but the thickness of the first upper adhesive layer 330 is not limited thereto.

The window 340 may be disposed below the first upper adhesive layer 330. The window 340 may include an optically transparent insulation material. For example, the window 340 may include a glass substrate or a synthetic resin film. When the window 340 is the glass substrate, the window 340 may have a thickness of about 80 micrometers or less and may have, for example, a thickness of about 30 micrometers, but the thickness of the window 340 is not limited thereto.

When the window 340 is the synthetic resin film, the window 340 may include a polyimide (PI) film or a polyethylene terephthalate (PET) film.

The window 340 may has a single layered structure or a multilayered structure. For example, the window 340 may include a plurality of plastic films bonded to each other by using an adhesive or include a glass substrate and a plastic film, which are bonded to each other by using an adhesive.

The second upper adhesive layer 350 may be disposed below the window 340. The window 340 and the impact absorbing layer 370 may be bonded to each other by the second upper adhesive layer 350. The second upper adhesive layer 350 may have a thickness of about 30 micrometers to about 40 micrometers, for example, about 35 micrometers, but the thickness of the second upper adhesive layer 350 is not limited thereto.

In an embodiment of the inventive concepts, a sidewall 340S of the window 340 and a sidewall 350S of the second upper adhesive layer 350 may be disposed inside sidewalls of other layers, for example, a sidewall 1000S of the display panel 100 and a sidewall 320S of the protective layer 320. The "inside disposition" may mean that disposition closer to the active area 1000A than other comparison objects.

A positional relationship between the layers may be changed by the folding operation of the electronic device 1000. According to an embodiment of the inventive concepts, since the sidewall 340S of the window 340 is disposed inside the sidewall 100S of the display panel 100 and the sidewall 320S of the protective layer 320, even though the positional relationship between the layers is changed, possibility that the sidewall 340S of the window 340 protrudes from the sidewall 320S of the protective layer 320 may be reduced. Thus, possibility that an external impact is transmitted through the sidewall 340S of the window 340 may be reduced. As a result, probability that cracks occurs in the window 340 may be reduced.

A first distance 340W between the sidewall 340S of the window 340 and the sidewall 320S of the protective layer 320 may be equal to or greater than a predetermined distance. Here, the first distance 340W may mean a distance in a direction parallel to the first direction DR1. Also, the first distance 340W may correspond to a distance between the sidewall 340S and the sidewall 320S when viewed on a plane.

The first distance 340W may be about 180 micrometers to about 205 micrometers, for example, about 196 micrometers, but is not limited thereto. For example, the first distance 340W may be about 50 micrometers or more and may be about 300 micrometers.

As the first distance 340W increases, the protective layer 320 may further protrudes from the window 340, and a portion of the protective layer 320 may be bent and attached to other components, for example, a case. Also, as the protective layer 320 increase in area, probability that foreign substances introduced from an upper side of the protective layer 320 are introduced to a lower side of the protective layer 320 may be reduced.

Also, the window 340 and the second upper adhesive layer 350 may be bonded to the impact absorbing layer 370 through a lamination process. In consideration of a lamination process tolerance, each of the window 340 and the second upper adhesive layer 350 may have an area less than that of the impact absorbing layer 370. In addition, the second upper adhesive layer 350 may have an area less than that of the window 340. For example, a pressure may be applied to the second upper adhesive layer 350 in the process of attaching the window 340. The second upper adhesive layer 350 may receive a pressure and then be stretched in a direction parallel to the first direction DR1 and the second direction DR2. Here, the second upper adhesive layer 350 may have an area less than that of the window 340 so that the second upper adhesive layer 350 does not protrude from the window 340.

When the first upper adhesive layer 330 and the second upper adhesive layer 350 are attached to each other, the window 340 may not slip to prevent a buckling phenomenon from occurring when the electronic device 1000 is folded. However, according to an embodiment of the inventive concepts, the second upper adhesive layer 350 may have an area less than that of the window 340. Thus, the first upper adhesive layer 330 may not be attached to the second upper adhesive layer 350, and probability that foreign substances adhere to the second upper adhesive layer 350 may be reduced.

A second distance 350W between the sidewall 350S of the second upper adhesive layer 350 and the sidewall 320S of the protective layer 320 may be equal to or greater than a predetermined distance. Here, the second distance 350W may mean a distance in a direction parallel to the first direction DR1. Also, the second distance 350W may correspond to a distance between the sidewall 350S and the sidewall 320S when viewed on the plane.

The second distance 350W may be about 392 micrometers, but is not limited thereto. For example, the second distance 350W may be selected from a range between about 292 micrometers and about 492 micrometers, but is not limited to this range. The light blocking layer 360 may be disposed between the impact absorbing layer 370 and the second upper adhesive layer 350. The light blocking layer 360 may be provided by being printed on a top surface of the impact absorbing layer 370. The light blocking layer 360 may overlap the peripheral area 1000NA. The light blocking layer 360 may be a colored layer and may be formed in a coating manner. The light blocking layer 360 may include a colored organic material or an opaque metal, and the materials constituting the light blocking layer 360 are not limited thereto.

In FIG. 2, the light blocking layer 360 is exemplarily illustrated as being disposed on the top surface of the impact absorbing layer 370, but the position of the light blocking layer 360 is not limited thereto. For example, the light blocking layer 360 may be provided on a top surface of the protective layer 320, a bottom surface of the protective layer 320, a top surface of the window 340, or a bottom surface of the window 340. Also, the light blocking layer 360 may be provided as a plurality of layers. In this case, a portion of the light blocking layer 360 may be disposed on the top surface of the impact absorbing layer 370, the other portion may be disposed on the top surface of the protective layer 320, the bottom surface of the protective layer 320, the top surface of the window 340, or the bottom surface of the window 340.

The impact absorbing layer 370 may be a functional layer for protecting the display panel 100 from an external impact. The impact absorbing layer 370 may be selected from films having an elastic modulus of about 1 GPa or more at room temperature. The impact absorbing layer 370 may be a stretched film including an optical function. For example, the impact absorbing layer 370 may be an optical axis control film. The impact absorbing layer 370 may have a thickness of about 35 micrometers to about 45 micrometers, for example, about 41 micrometers, but the thickness of the impact absorbing layer 370 is not limited thereto. In an embodiment of the inventive concepts, the impact absorbing layer 370 may be omitted.

The second hard coating layer 380 may be provided on a lower surface of the impact absorbing layer 370. The impact absorbing layer 370 may include a curved surface. The top surface of the impact absorbing layer 370 may contact the second upper adhesive layer 350. Thus, the curved portion of the top surface of the impact absorbing layer 370 may be filled by the second upper adhesive layer 350. Thus, an optical issue may not occur on the top surface of the impact absorbing layer 370. The bottom surface of the impact absorbing layer 370 may be planarized by the second hard coating layer 380. That is, when a first hole 101H (see FIG. 4) is provided up to the second adhesive layer 1020 by cutting, a surface exposed by the first hole 101H (see FIG. 4) may be smooth. Thus, as the second hard coating layer 380 covers an uneven surface of the impact absorbing layer 370, haze that may occur on the uneven surface of the impact absorbing layer 370 may be prevented from occurring.

The upper member 300 may be bonded to the anti-reflection member 200 through the second adhesive layer 1020. The second adhesive layer 1020 may include a common adhesive or a sticking agent. The second adhesive layer 1020 may have a thickness of about 20 micrometers to about 30 micrometers, for example, about 25 micrometers, and the thickness of the second adhesive layer 1020 is not limited thereto.

The lower functional layers may be disposed below the display panel 100. For example, the lower functional layers may include a lower protective film 400, a cushion member 500, a first lower member 600, a second lower member 700, and a step compensation member 800. The components included in the lower functional layers are not limited to the components described above. At least a portion of the above-described components may be omitted, and other components may be added.

The lower protective film 400 may be bonded to a rear surface of the display panel 100 through the third adhesive layer 1030. The lower protective film 400 may prevent scratches from being generated in the rear surface of the display panel 100 during the process of manufacturing the display panel 100. The lower protective film 400 may be a colored polyimide film. For example, the lower protective film 400 may be an opaque yellow film, but is not limited thereto.

The lower protective film 400 may have a thickness of about 30 micrometers to about 50 micrometers, for example, about 40 micrometers. The third adhesive layer 1030 may have a thickness of about 13 micrometers to about 25 micrometers, for example, about 18 micrometers. However, the thickness of the lower protective film 400 and the thickness of the third adhesive layer 1030 are not limited thereto.

The cushion member 500 may be disposed below the lower protective film 400. The cushion member 500 may protect the display panel 100 from an impact transmitted from the lower portion. The impact resistance characteristics of the electronic device 1000 may be improved by the cushion member 500.

The cushion member 500 may include a first cushion adhesive layer 510, a barrier film 520, a cushion layer 530, and a second cushion adhesive layer 540. The components included in the cushion member 500 are not limited to the components described above. At least a portion of the above-described components may be omitted, and other components may be added.

The first cushion adhesive layer 510 and the second cushion adhesive layer 540 may include a common adhesive or an adhesive agent. The first cushion adhesive layer 510 may be attached to the lower protective film 400, and the second cushion adhesive layer 540 may be attached to the first lower member 600. The first cushion adhesive layer 510 may have a thickness of about 20 micrometers to about 30 micrometers, for example, about 25 micrometers. The second cushion adhesive layer 540 may have a thickness of about 4 micrometers to about 15 micrometers, for example, about 8 micrometers. However, the thickness of each of the first cushion adhesive layer 510 and the second cushion adhesive layer 540 is not limited thereto.

The barrier film 520 may be provided to improve impact resistance performance. The barrier film 520 may serve to prevent the display panel 100 from being deformed. The barrier film 520 may be a synthetic resin film, for example, a polyimide film, but is not limited thereto. The barrier film 520 may have a thickness of about 30 micrometers to about 40 micrometers, for example, about 35 micrometers, but the thickness of the barrier film 520 is not limited thereto.

The cushion layer 530 may include, for example, foamed foam or sponge. The foamed foam may include polyurethane foam or thermoplastic polyurethane foam. When the cushion layer 530 includes the foamed foam, the cushion layer 530 may be formed by using the barrier film 520 as a base layer. For example, a foaming agent may be foamed on the barrier film 520 to form the cushion layer 530.

The cushion layer 530 may have a thickness of about 80 micrometers to about 120 micrometers, for example, about 100 micrometers, but the thickness of the cushion layer 530 is not limited thereto.

At least one of the barrier film 520 or the cushion layer 530 may have a color that absorbs light. For example, at least one of the barrier film 520 or the cushion layer 530 may have a black color. In this case, the components disposed below the cushion member 500 may be prevented from being visible from the outside.

The first lower member 600 may be disposed below the cushion member 500. The first lower member 600 may include a plate 610, a lower adhesive layer 620, and a cover layer 630. The components included in the first lower member 600 are not limited to the components described above. At least a portion of the above-described components may be omitted, and other components may be added.

The plate 610 may include a material having an elastic modulus of about 60 GPa or more at room temperature. For example, the plate 610 may be SUS304, but is not limited thereto. The plate 610 may support components disposed at an upper side. Also, heat dissipation performance of the electronic device 1000 may be improved by the plate 610.

An opening 611 may be defined in a portion of the plate 610. The opening 611 may be defined in an area overlapping the second area 1000A2. The opening 611 may overlap the second area 1000A2 on the plane, for example, when viewed in the third direction DR3. A portion of the plate 610 may be more easily deformed by the opening 611.

The cover layer 630 may be attached to the plate 610 by the lower adhesive layer 620. The lower adhesive layer 620 may include a common adhesive or an adhesive agent. The cover layer 630 may cover the opening 611 of the plate 610. Thus, foreign substances may be additionally prevented from being into the opening 611.

The cover layer 630 may include a material having an elastic modulus less than that of the plate 610. For example, the cover layer 630 may include thermoplastic polyurethane, but is not limited thereto.

The plate 610 may have a thickness of about 120 micrometers to about 180 micrometers, for example, about 150 micrometers. The lower adhesive layer 620 may have a thickness of about 4 micrometers to about 15 micrometers, for example, about 8 micrometers. The cover layer 630 may have a thickness of about 4 micrometers to about 15 micrometers, for example, about 8 micrometers. However, the thickness of the plate 610, the thickness of the lower adhesive layer 620, and the thickness of the cover layer 630 are not limited to the above-described values.

The second lower member 700 may be disposed below the first lower member 600. The second lower members 700 may be spaced apart from each other. For example, one second lower member 700 may be disposed on the first area 1000A1 and the other second lower member 700 may be disposed on the third area 1000A3.

Each of the second lower members 700 may be attached to the first lower member 600 by the fourth adhesive layers 1040. For example, one fourth adhesive layer 1040 may be attached to a bottom surface of the first lower member 600 overlapping the first area 1000A1, and the other fourth adhesive layer 1040 may be attached to the bottom surface of the first lower member 600 overlapping the third area 1000A3. That is, the fourth adhesive layers 1040 may not overlap the second area 1000A2. Each of the fourth adhesive layers 1040 may have a thickness of about 8 micrometers to about 15 micrometers, for example, about 8 micrometers, but the thickness of each of the fourth adhesive layers 1040 is not limited thereto.

Although not shown, a step compensation film may be further disposed between each of the second lower members 700 and the first lower member 600. For example, the step compensation film may be provided on an area overlapping the second area 1000A2. One surface of the step compensation film may have adhesive force less than that of the other surface. For example, the one surface may not have adhesive force. The one surface may be a surface facing the first lower member 600.

Each of the second lower members 700 may include a lower plate 710, a heat dissipation sheet 720, and an insulating film 730. The components included in the second lower members 700 are not limited to the components described above. At least a portion of the above-described components may be omitted, and other components may be added.

The lower plate 710 is provided in plurality. One of the lower plates 710 may be disposed to overlap the first area 1000A1 and a portion of the second area 1000A2, and the other portion of the lower plates 710 may be disposed to overlap the other portion of the second area 1000A2 and the third area 1000A3.

The lower plates 710 may be disposed to be spaced apart from each other on the second area 1000A2. However, the lower plates 710 may be disposed as close as possible to support the area in which the opening 611 of the plate 610 is defined. For example, the lower plates 710 may prevent a shape of the area, in which the opening 611 of the plate 610 is defined, from being deformed by a pressure applied from the upper portion.

Also, the lower plates 710 may serve to prevent the components disposed above the second lower member 700 from being deformed by the components disposed below the second lower member 700.

Each of the lower plates 710 may include a metal alloy. For example, each of the lower plates 710 may include a copper alloy. However, the material forming the lower plate 710 is not limited thereto. Each of the lower plates 710 may have a thickness of about 60 micrometers to about 100 micrometers, for example, about 80 micrometers, and the thickness of the lower plates 710 is not limited thereto.

The heat dissipation sheet 720 may be attached below the lower plate 710. The heat dissipation sheet 720 may be a thermal conductive sheet having high thermal conductivity. For example, the heat dissipation sheet 720 may include a heat dissipation layer 721, a first heat dissipation adhesive layer 722, a second heat dissipation adhesive layer 723, and a gap tape 724.

The gap tape 724 may be attached to the first heat dissipation adhesive layer 722 and the second heat dissipation adhesive layer 723, which are spaced apart from each other, with the heat dissipation layer 721 therebetween. The gap tape 724 may be provided as a plurality of layers. For example, the gap tape 724 may include a base layer, an upper adhesive layer disposed on a top surface of the base layer, and a lower adhesive layer disposed on a bottom surface of the base layer.

The heat dissipation layer 721 may be attached to the lower plate 710 by the first heat dissipation adhesive layer 722. The heat dissipation layer 721 may be sealed by the first heat dissipation adhesive layer 722, the second heat dissipation adhesive layer 723, and the gap tape 724. The heat dissipation layer 721 may be a graphitized polymer film. The polymer film may be, for example, a polyimide film. Each of the first heat dissipation adhesive layer 722 and the second heat dissipation adhesive layer 723 may have a thickness of about 3 micrometers to about 8 micrometers, for example, about 5 micrometers, and each of the heat dissipation layer 721 and the gap tape 724 may have a thickness of about 10 micrometers to about 25 micrometers, for example, about 17 micrometers. However, the thickness of each of the first heat dissipation adhesive layer 722, the second heat dissipation adhesive layer 723, the heat dissipation layer 721, and the gap tape 724 is not limited to the above-described numerical value.

The insulating film 730 may be attached below the heat dissipation sheet 720. For example, the insulating film 730 may be attached to the second heat dissipation adhesive layer 723. An occurrence of rattling of the electronic device 1000 may be prevented by the insulating film 730. The insulating film 730 may have a thickness of about 15 micrometers, but is not limited thereto.

The step compensation member 800 may be attached below the plate 610. For example, the lower adhesive layer 620 may be attached below one portion of the plate 610, and the step compensation member 800 may be attached below the other portion of the plate 610.

The step compensation member 800 may include a first compensation adhesive layer 810, a step compensation film 820, and a second compensation adhesive layer 830. The first compensation adhesive layer 810 may be attached to the bottom surface of the plate 610. The step compensation film 820 may be a synthetic resin film. The second compensation adhesive layer 830 may be attached to a bottom surface of the step compensation film 820 and a folding set (not shown).

Figure 3B:
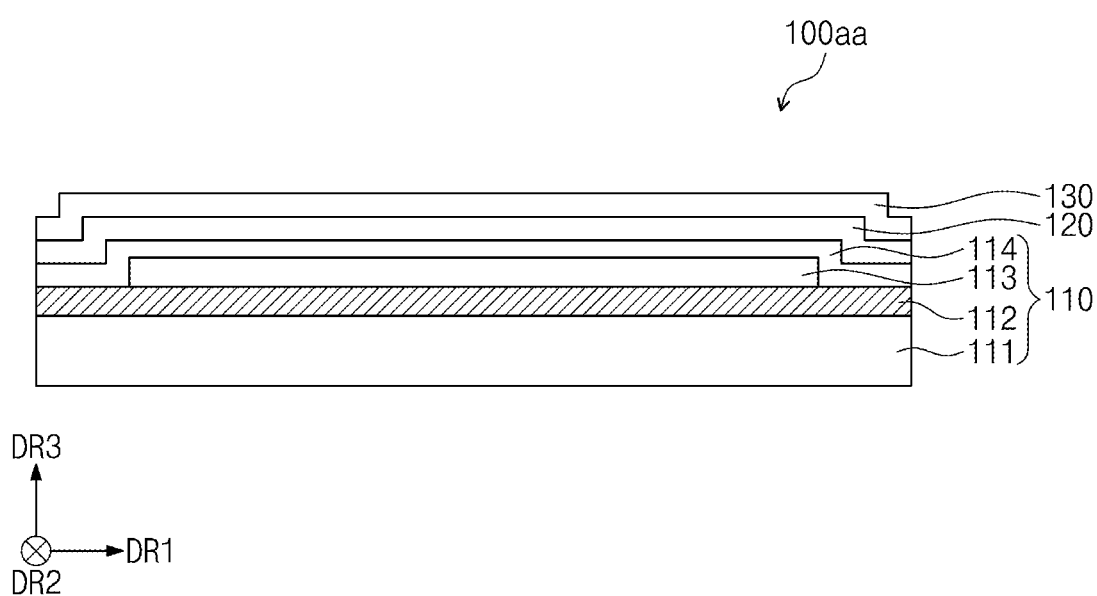
FIG. 3B is a cross-sectional view of a display panel according to an embodiment of the inventive concepts.

FIG. 3B is a cross-sectional view of a display panel according to an embodiment of the inventive concepts.

Referring to FIG. 3B, a display panel 100aa may further include an anti-reflection layer 130 when compared with the display panel 100 described in FIG. 3A. In this case, the anti-reflection member 200 (see FIG. 2) and the first adhesive layer 1010 (see FIG. 2) may be removed from the electronic device 1000 (see FIG. 2) including the display panel 100aa.

The display panel 100aa may include a display layer 110, a sensor layer 120, and an anti-reflection layer 130.

The anti-reflection layer 130 according to an embodiment of the inventive concepts may include color filters. The color filters may have a predetermined arrangement. The arrangement of the color filters may be determined in consideration of emission colors of pixels included in the display layer 110. Also, the anti-reflection layer 130 may further include a black matrix adjacent to the color filters.

The anti-reflection layer 130 according to an embodiment of the inventive concepts may include a destructive interference structure. For example, the destructive interference structure include first reflection layer and a second reflection layer, which are disposed on layers different from each other. First reflected light and second reflected light, which are respectively reflected from the first reflection layer and the second reflection layer, may destructively interfere, and thus, the external light may be reduced in reflectance.

Figure 4:
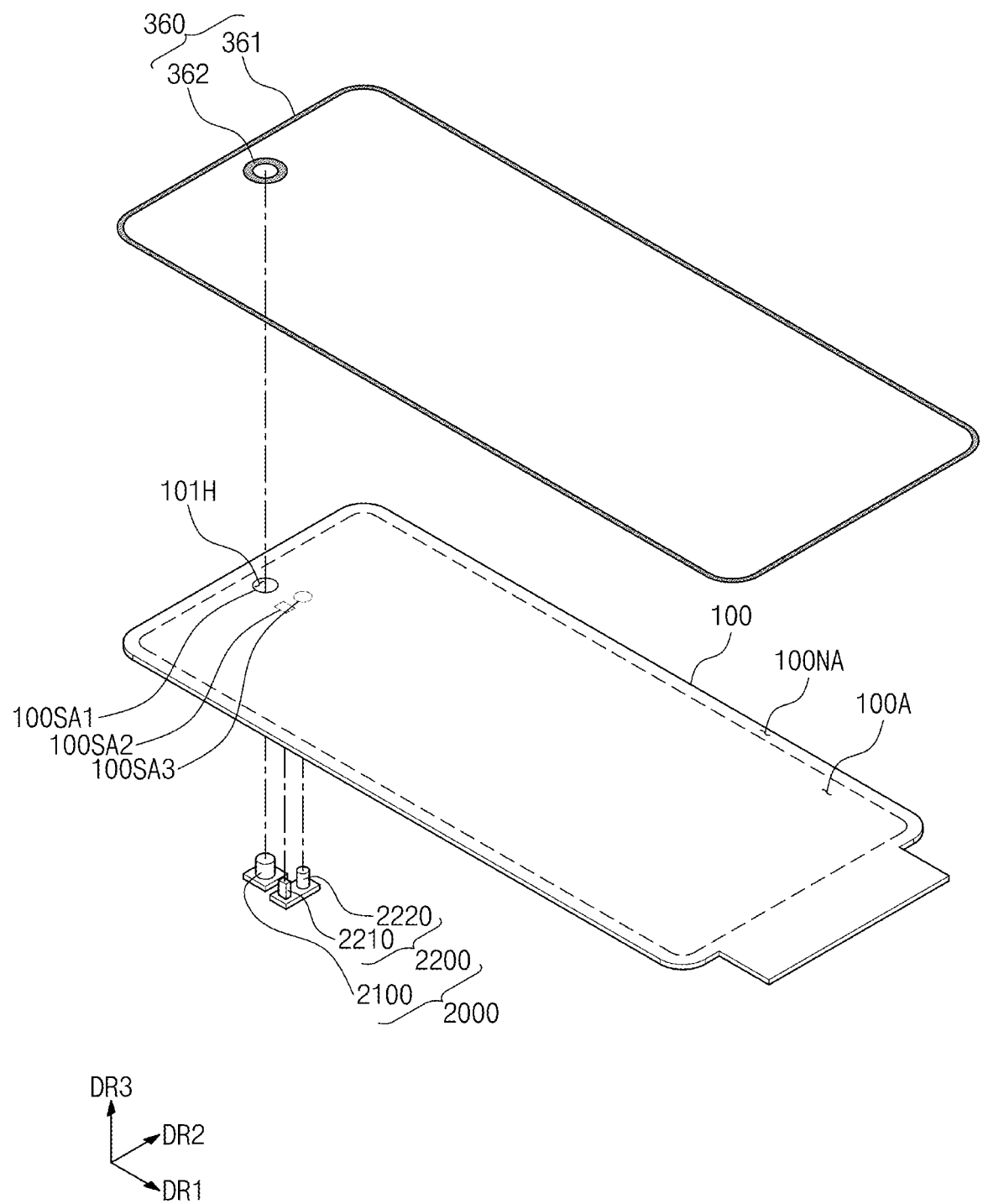
FIG. 4 is an exploded perspective view illustrating a portion of constituents of the electronic device according to an embodiment of the inventive concepts.

FIG. 4 is an exploded perspective view illustrating a portion of constituents of the electronic device according to an embodiment of the inventive concepts.

Referring to FIG. 4, a light blocking layer 360, a display panel 100, and a plurality of electronic modules 2000 among the components of the electronic device 1000 (see FIG. 2) are exemplarily illustrated. The plurality of electronic modules 2000 may include a camera module 2100 and a proximity illumination sensor 2200.

The proximity illumination sensor 2200 may include a light emitting module 2210 and a light receiving module 2220. The light emitting module 2210 and the light receiving module 2220 may be mounted on one substrate. The light emitting module 2210 may generate and output light. For example, the light emitting module 2210 may output infrared rays. Also, the light emitting module 2210 may include a light emitting diode. The light receiving module 2220 may sense the infrared rays. The light receiving module 2220 may be activated when infrared rays having a predetermined level or more is sensed. The light receiving module 2220 may include a CMOS sensor. The infrared rays generated in the light emitting module 2210 may be outputted and then be reflected by an external subject (for example, a user's finger or face), and the reflected infrared rays may be incident into the light receiving module 2220.

An active area 100A and a peripheral area 100NA may be defined on the display panel 100. The active area 100A may correspond to the active area 1000A illustrated in FIG. 1A, and the peripheral area 100NA may correspond to the peripheral area 1000NA illustrated in FIG. 1A.

A first sensing area 100SA1 overlapping the camera module 2100 may be surrounded by the active area 100A, and a second sensing area 100SA2 overlapping the light emitting module 2210 and a third sensing area 100SA3 overlapping the light receiving module 2220 may be portions of the active area 100A.

A first hole 101H may be defined in a portion of the display panel 100. The first hole 101H may be provided to correspond to the first sensing area 1005A1. Thus, the camera module 2100 may receive an external input transmitted through the first hole 101H.

The light blocking layer 360 may include a first light blocking pattern 361 and a second light blocking pattern 362. The first light blocking pattern 361 may be a pattern covering the peripheral area 100NA. When viewed on the plane, the second light blocking pattern 362 may surround the camera module 2100.

Figure 5:
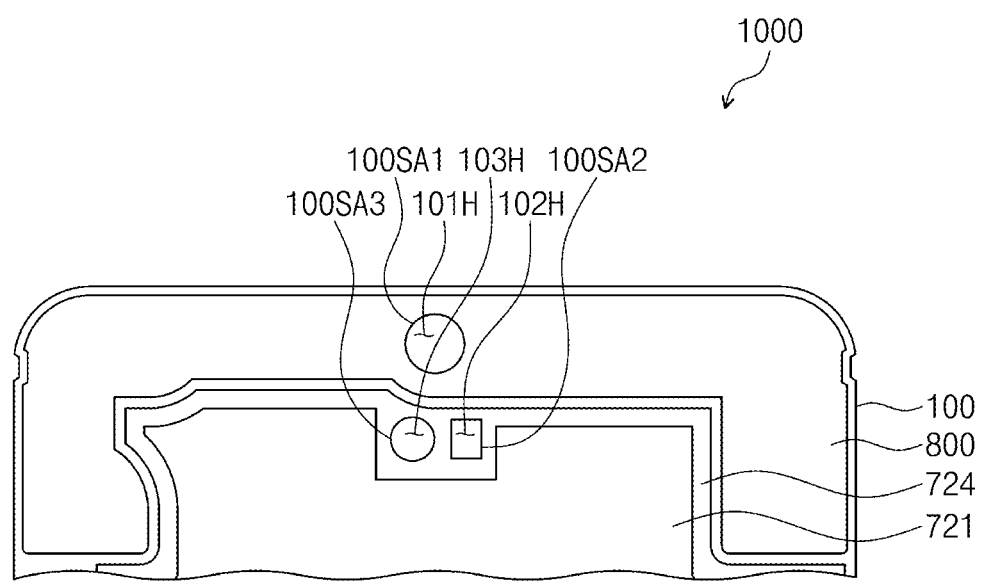
FIG. 5 is a rear view illustrating a portion of constituents of an electronic device according to an embodiment of the inventive concepts.
Figure 5:
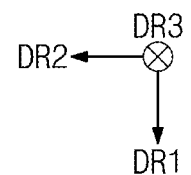

FIG. 5 is a rear view illustrating a portion of constituents of an electronic device according to an embodiment of the inventive concepts.

Referring to FIGS. 4 and 5, the display panel 100, the step compensation member 800, the heat dissipation layer 721, and the gap tape 724 are exemplarily illustrated.

A first hole 101H, a second hole 102H, and a third hole 103H may be provided to correspond to the first sensing area 100SA1, the second sensing area 100SA2, and the third sensing area 100SA3, respectively.

The first hole 101H, the second hole 102H, and the third hole 103H may be provided by removing some constituents of the electronic device 1000 (see FIG. 1A), and thus, a detailed description thereof will be described later.

The first hole 101H may be provided to overlap the step compensation member 800, and each of the second hole 102H and the third hole 103H may be provided to overlap the gap tape 724. Thus, when viewed on the plane, the first hole 101H may be surrounded by the step compensation member 800, and each of the second hole 102H and the third hole 103H may be surrounded by the gap tape 724.

Figure 6:
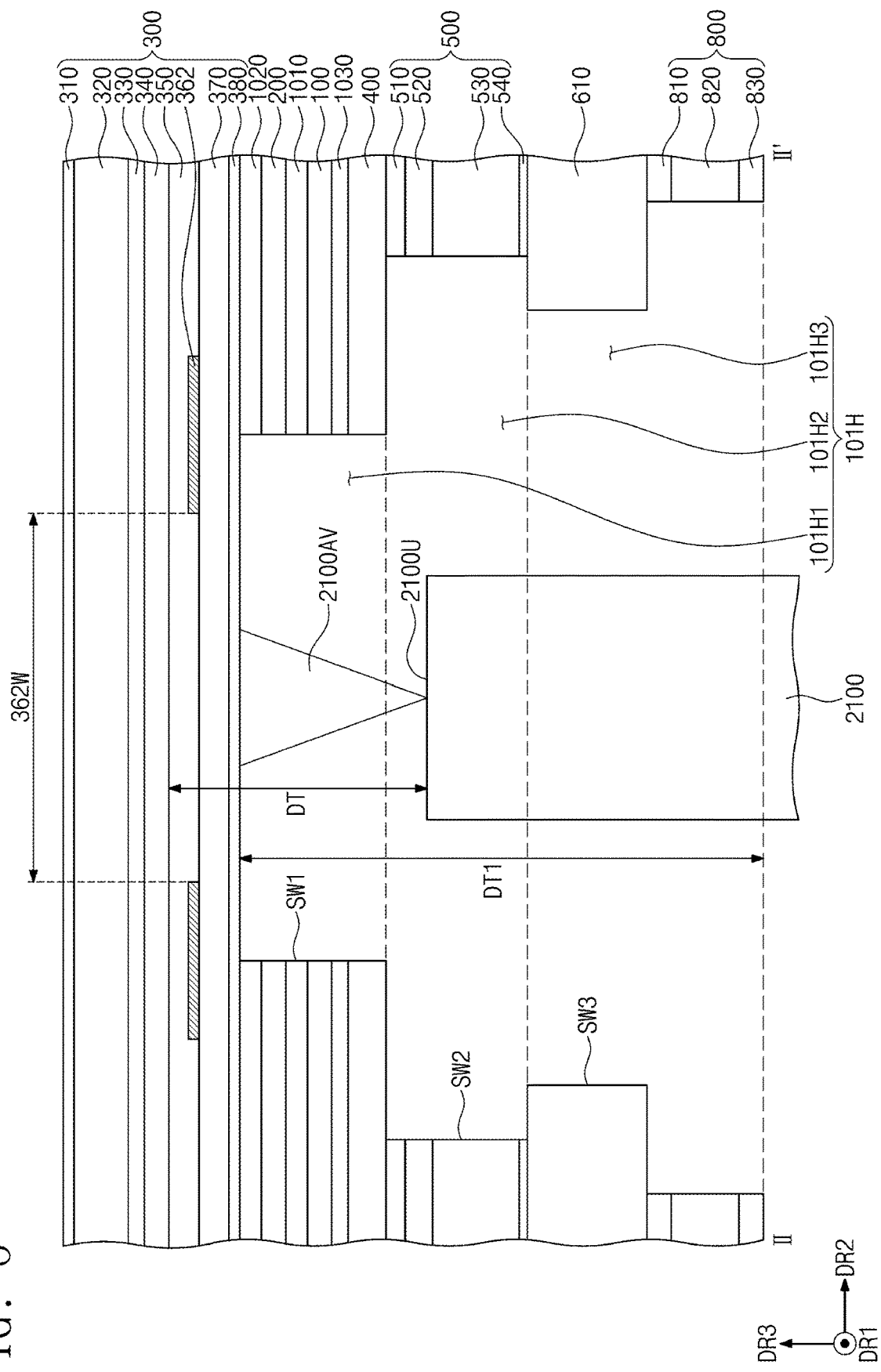
FIG. 6 is a cross-sectional view taken along line II-II' of FIG. 1A according to an embodiment of the inventive concepts.

FIG. 6 is a cross-sectional view taken along line II-II of FIG. 1A according to an embodiment of the inventive concepts.

Referring to FIG. 6, the first hole 101H in which the camera module 2100 is inserted is illustrated. The first hole 101H may include a first hole portion 101H1, a second hole portion 101H2, and a third hole portion 101H3.

The first hole portion 101H1 may be defined by a first sidewall SW1, the second hole portion 101H2 may be defined by a second sidewall SW2, and the third hole portion 101H3 may be defined by the third sidewall SW3.

The first hole portion 101H1, the second hole portion 101H2, and the third hole portion 101H3 may have sizes different from each other. For example, the first hole portion 101H1 may have the smallest size, the second hole portion 101H2 may have the largest size, and the third hole portion 101H3 may have a size corresponding between the size of the first hole portion 101H1 and the size of the second hole portion 101H2.

The first hole portion 101H1 may be formed through a laser cutting process. For example, the first hole portion 101H1 may be formed by cutting a portion from the lower protective film 400 to the second adhesive layer 1020 using a laser. The second hole portion 101H2 may be a portion provided in the cushion member 500, and the cushion member 500 may be punched to define the second hole portion 101H2. The cushion member 500 in which the second hole portion 101H2 is defined may be attached to the lower protective film 400. The plate 610 and the step compensation member 800 may be punched to define the third hole portion 101H3. The third hole portion 101H3 may be formed by a shearing process on the plate 610 and the step compensation member 800.

According to an embodiment of the present disclosure, the cushion member 500 in which the second hole portion 101H2 is defined may be attached to the plate 610 in which the third hole portion 101H3 is defined. Thereafter, the cushion member 500 may be attached to the lower protective film 400. Thus, the sizes of the first hole portion 101H1, the second hole portion 101H2, and the third hole portion 101H3 may be different from each other in consideration of component tolerances, equipment tolerances, and folding tolerances. [0163] The folding tolerances may be tolerances generated by the folding operation of the electronic device 1000. For example, the folding tolerances may be tolerances in consideration of a moving amount (or slip) of each of the components when the electronic device 1000 is fully folded or tolerances in consideration of an unrestored moving amount of each of the component when the electronic device 1000 is unfolded after being folded.

According to an embodiment of the inventive concepts, since the sizes of the first hole portion 101H1, the second hole portion 101H2, and the third hole portion 101H3 are determined in consideration of the folding tolerances, an interference between the inner sidewall of the first hole 101H and the electronic module inserted into the first hole 101H, for example, the camera module 2100, may not occur. Also, a second light blocking pattern 362 disposed corresponding to the position of the first hole 101H may also be disposed in consideration of the folding tolerances. Thus, even when the electronic device 1000 is folded and unfolded, possibility that the second light blocking pattern 362 covers the active area 100A (see FIG. 4) of the display panel 100, or the second light blocking pattern 362 covers a viewing angle area 2100AV of the camera module 2100 may be reduced.

The camera module 2100 may be inserted and disposed within the first hole 101H. The second upper adhesive layer 350, the light blocking layer 360, the impact absorbing layer 370, and the second hard coating layer 380 may be disposed between the camera module 2100 and the window 340. Thus, since at least one or more layers are disposed between the camera module 2100 and the window 340, possibility that the window 340 is damaged by the camera module 2100 may be reduced. Therefore, product reliability may be improved.

A top surface 2100U of the camera module 2100 may be disposed within the second hole portion 101H2 provided in the cushion member 500. The second hole portion 101H2 may be a hole portion having the largest diameter among the first to third hole portions 101H1, 101H2, and 101H3. Therefore, even if the electronic device 1000 is folded, and thus, the positional relationship between the layers is deformed, probability of collision with the second sidewall SW2 of the camera module 2100 may be reduced. Therefore, product reliability may be improved.

The position of the top surface 2100U of the camera module 2100 is not limited to the example illustrated in FIG. 6. For example, the top surface 2100U of the camera module 2100 may be disposed within the first hole portion 101H1. In this case, a width 362W of the area surrounded by the second light blocking pattern 362 may be designed to be less than that when the top surface 2100U of the camera module 2100 is disposed in the second hole portion 101H2.

For example, the second light blocking pattern 362 may be designed so as not to overlap the viewing angle area 2100AV of the camera module 2100. When viewed on the plane, the second light blocking pattern 362 may be disposed to be spaced a predetermined distance from the viewing angle area 2100AV of the camera module 2100 in consideration of process errors. Since the camera module 2100 is closer to the second light blocking pattern 362, even if the width 362W of the area surrounded by the second light blocking pattern 362 is reduced, the second light blocking pattern 362 may not cover the viewing angle area 2100AV of the camera module 2100.

According to an embodiment of the inventive concepts, a distance DT between the camera module 2100 and the window 340 may be secured over a predetermined distance. When the distance DT between the camera module 2100 and the window 340 is secured over the predetermined distance, probability that the window 340 is damaged by the camera module 2100 may be reduced. Therefore, the product reliability may be improved. The damage may be cracks when the window 340 is provided as the glass substrate or may be step when the window 340 is provided as the synthetic resin film.

For example, the distance DT may range of about 60% to about 200% of the total sum of the thicknesses of the components in which a modulus of the first hole 101H is less than or equal to the reference modulus. The components in which the first hole 101H is defined in FIG. 3 may correspond to components disposed below the second hard coating layer 380. The reference modulus may be about 100 MPa or less, for example, about 50 MPa or less and 0 MPa or more.

The components that are provided with the first hole 101H defined therethrough and have the modulus equal to or smaller than the reference modulus may include the first adhesive layer 1010, the second adhesive layer 1020, the third adhesive layer 1030, the first cushion adhesive layer 510, the cushion layer 530, the second cushion adhesive layer 540, the first compensation adhesive layer 810, and the second compensation adhesive layer 830.

The first adhesive layer 1010 may have a thickness of about 25 micrometers, the second adhesive layer 1020 may have a thickness of about 25 micrometers, the third adhesive layer 1030 may have a thickness of about 18 micrometers, the first cushion adhesive layer 510 may have a thickness of about 25 micrometers, the cushion layer 530 may have a thickness of about 100 micrometer, the second cushion adhesive layer 540 may have a thickness of about 8 micrometer, the first compensation adhesive layer 810 may have a thickness of about 17 micrometer, and the second compensation adhesive layer 830 may have a thickness of about 17 micrometers. Each of the thicknesses may have a process error. Thus, the sum of the thicknesses may be about 183 micrometers to about 300 micrometers, for example, about 235 micrometers. However, the sum of the thicknesses is not limited thereto.

The distance DT between the camera module 2100 and the window 340 may be determined in consideration of a maximum compression ratio of the layers, each of which has a modulus equal to or less than the reference modulus. For example, the distance DT may be equal to or greater than a value that the sum of the thicknesses multiplied by the maximum compression ratio. The distance DT may be may be about 110 micrometers or more, for example, about 141 micrometers or more.

According to an embodiment of the inventive concepts, even though the components are maximally compressed by the pressure generated while the electronic device 1000 is used, the window 340 and the camera module 2100 may be spaced a predetermined distance from each other. Thus, the probability that the window 340 is damaged by the camera module 2100 may be greatly reduced. Therefore, the product reliability may be improved.

Figure 7:
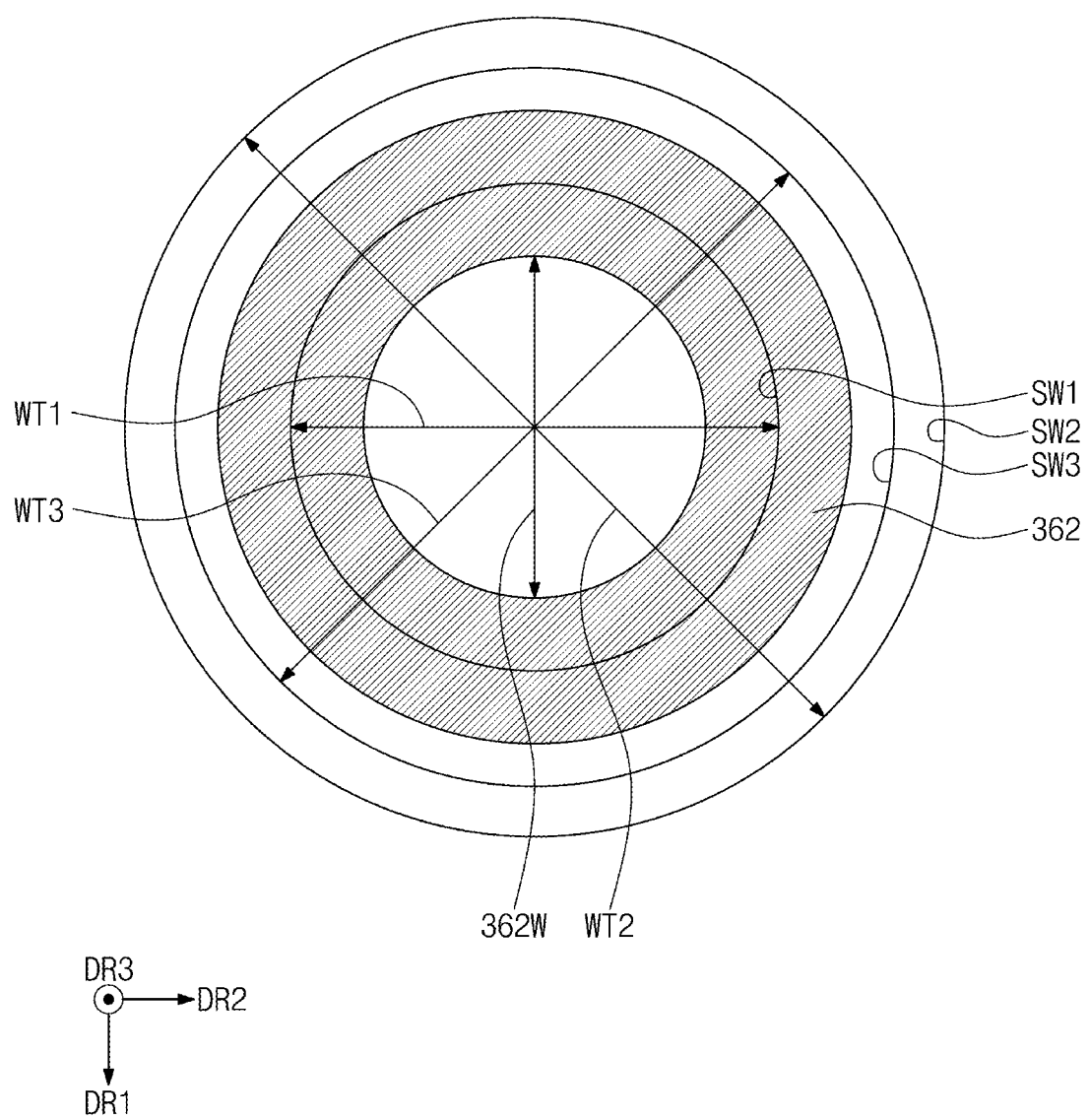
FIG. 7 is a plan view of the electronic device according to an embodiment of the inventive concepts.

FIG. 7 is a plan view of the electronic device according to an embodiment of the inventive concepts.

In FIG. 7, the second light blocking pattern 362, the first sidewall SW1, the second sidewall SW2, and the third sidewall SW3 are exemplarily illustrated.

When viewed on the plane, the first sidewall SW1 may overlap the second light blocking pattern 362, and the second sidewall SW2 and the third sidewall SW3 may not overlap the second light blocking pattern 362. When viewed on the plane, the third sidewall SW3 may surround the second light blocking pattern 362, and the second sidewall SW2 may surround the third sidewall SW3.

Referring to FIGS. 6 and 7, a first width WT1 of the first hole portion 101H1, a second width WT2 of the second hole portion 101H2, and a third with WT3 of the third hole portion 101H3 may be different from each other. For example, the second width WT2 may be greater than each of the first width WT1 and the third width WT3, and the third width WT3 may be greater than the first width WT1.

Figure 8:
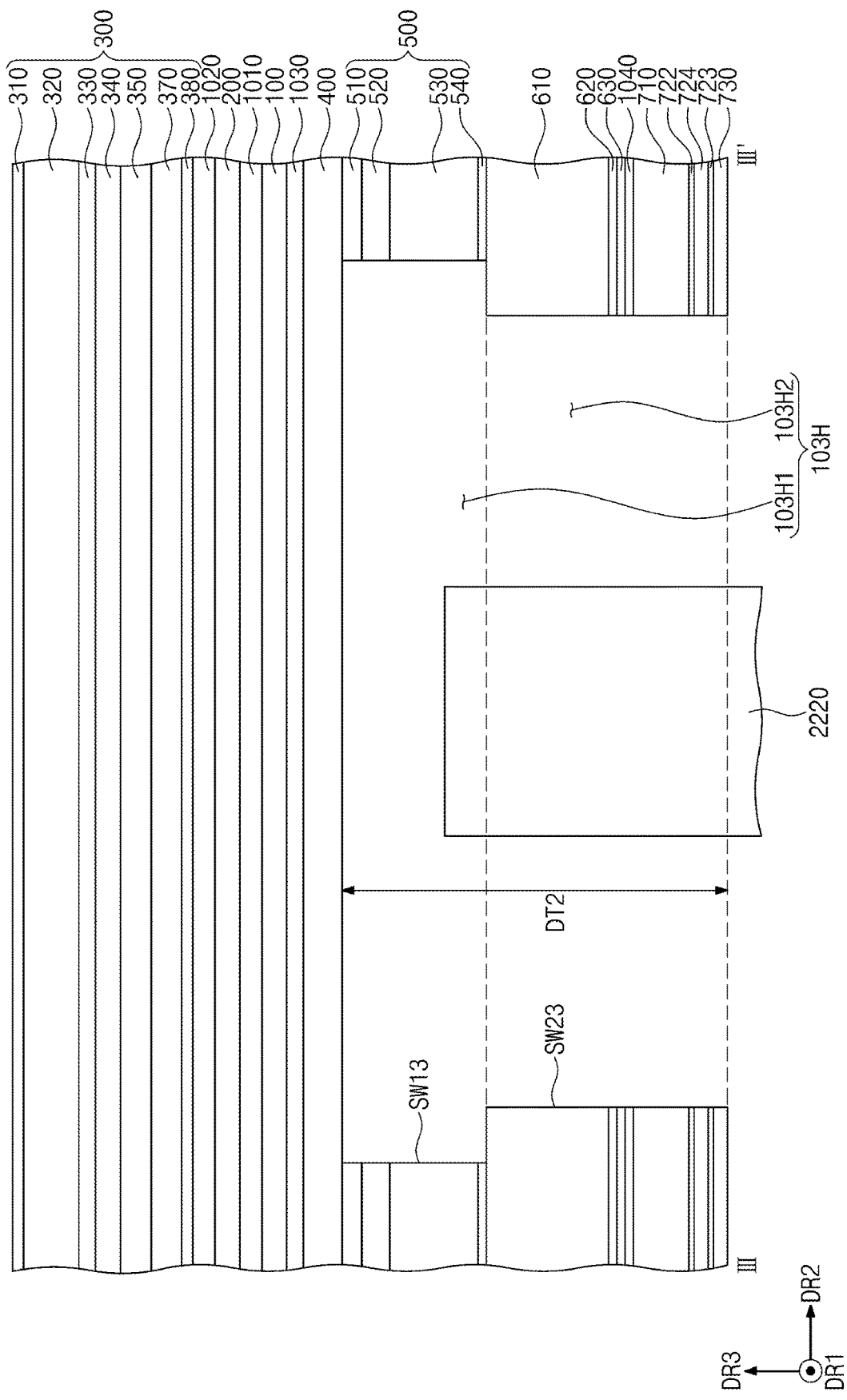
FIG. 8 is a cross-sectional view taken along line of FIG. 1A according to an embodiment of the inventive concepts.

FIG. 8 is a cross-sectional view taken along line of FIG. 1A according to an embodiment of the inventive concepts.

Referring to FIG. 8, the third hole 103H in which the light receiving module 2220 is inserted is illustrated. Since the second hole 102H (see FIG. 5) into which the light emitting module 2210 (see FIG. 4) is inserted may have substantially the same cross-sectional structure as the third hole 103H, contents with respect to the second hole 102H (see FIG. 5) may be understood through the following description.

The third hole 103H may include a first hole portion 103H1 and a second hole portion 103H2. The first hole portion 103H1 may be defined by the first sidewall SW13, and the second hole portion 103H2 may be defined by the second sidewall SW23.

The first hole portion 103H1 and the second hole portion 103H2 may have sizes different from each other. For example, the size of the first hole portion 103H1 may be larger than that of the second hole portion 103H2.

The first hole portion 103H1 may be a portion provided in the cushion member 500, and the cushion member 500 may be punched to define the first hole portion 103H1. The first lower member 600 and the second lower member 700 may be punched to define a second hole portion 103H2.

The third hole 103H may not be provided in the display panel 100. For example, the third hole 103H may be provided in only at least a portion of the components disposed below the display panel 100. Thus, a portion of the display panel 100 overlapping the third hole 103H may display an image and sense an input applied from the outside.

The first hole 101H (see FIG. 6) may pass through the display panel 100, but the third hole 103H may not pass through the display panel 100. That is, a depth DT1 (see FIG. 6) of the first hole 101H (see FIG. 6) may be greater than that DT2 of the third hole 103H.

Figure 9A:
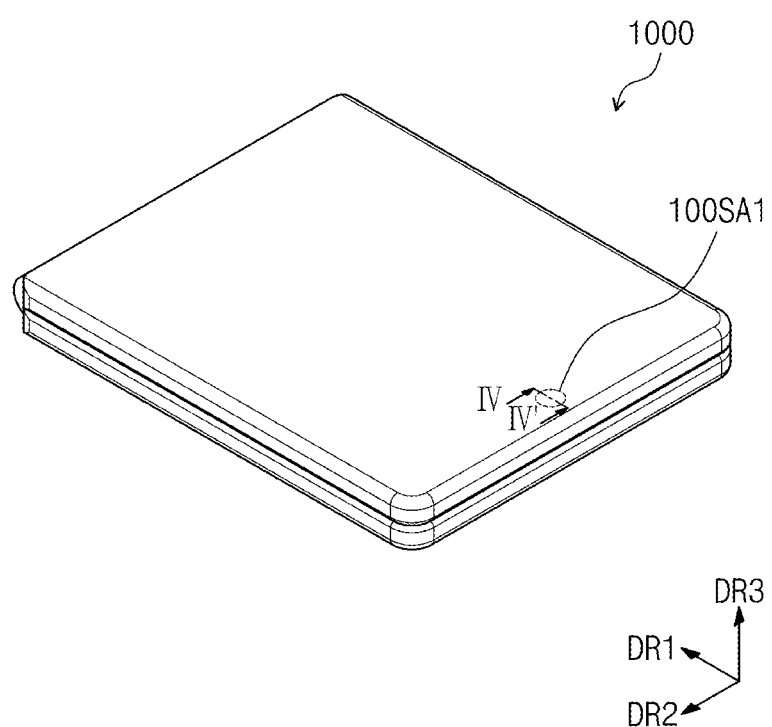
FIG. 9A is a perspective view illustrating an operation of the electronic device according to an embodiment of the inventive concepts.
Figure 9B:
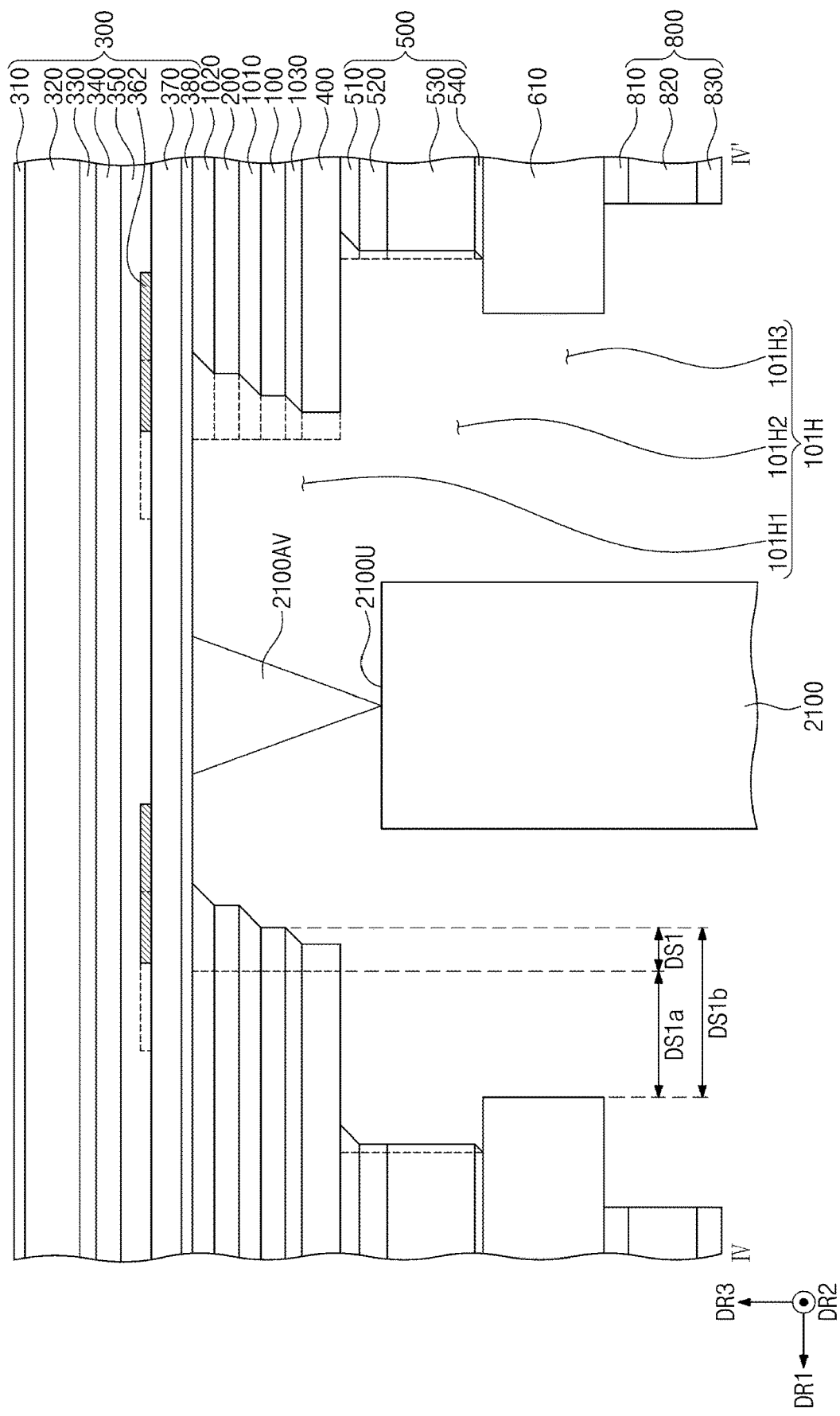
FIG. 9B is a cross-sectional view taken along line IV-IV' of FIG. 9A.
Figure 10A:
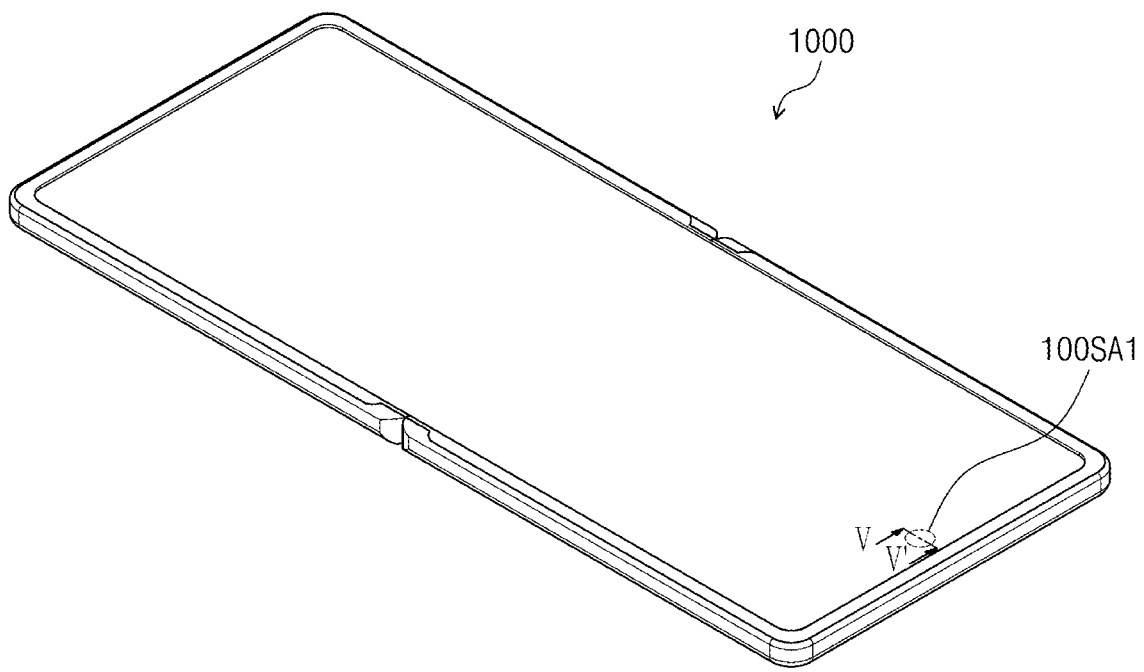
FIG. 10A is a perspective view illustrating an operation of the electronic device according to an embodiment of the inventive concepts.
Figure 10B:
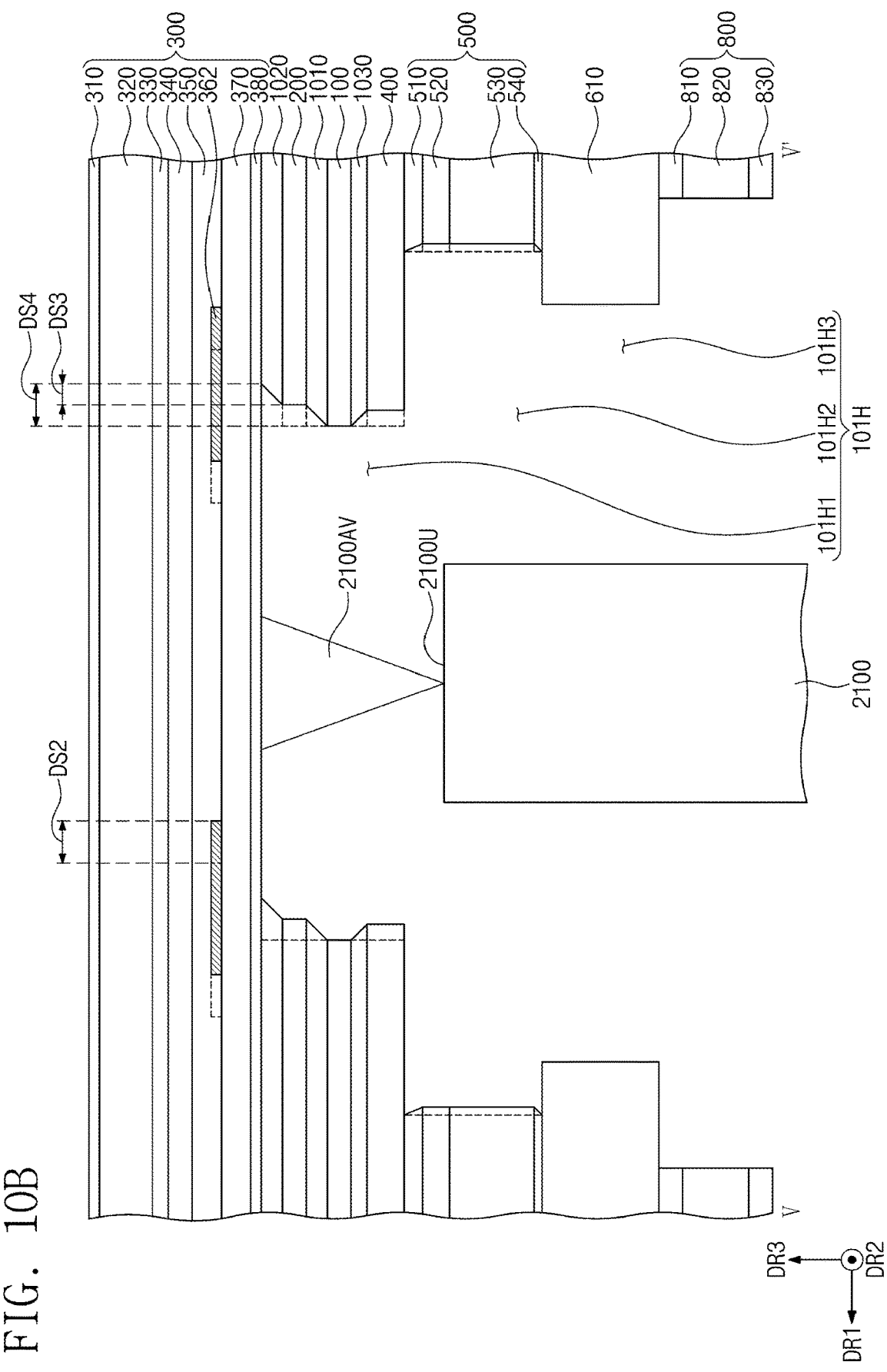
FIG. 10B is a cross-sectional view taken along line V-V' of FIG. 10A.

FIG. 9A is a perspective view illustrating an operation of the electronic device according to an embodiment of the inventive concepts. FIG. 9B is a cross-sectional view taken along line IV-IV' of FIG. 9A. FIG. 10A is a perspective view illustrating an operation of the electronic device according to an embodiment of the inventive concepts. FIG. 10B is a cross-sectional view taken along line V-V' of FIG. 10A.

FIG. 9A illustrates a state in which the electronic device 1000 is fully folded. This may be referred to as a first state. FIG. 9B illustrates a cross-sectional view illustrating a state in which the first sensing area 100SA1 of the electronic device 1000 that is folded in the state of FIG. 9A is cut. FIG. 10A illustrates a state in which the electronic device 1000 is folded and then unfolded again. This may be referred to as a second state. FIG. 10B illustrates a cross-sectional view illustrating a state in which the first sensing area 100SA1 of the electronic device 1000 that is unfolded in the state of FIG. 10A is cut.

FIGS. 9A, 9B, 10A, and 10B illustrate views of the electronic device 1000 disposed in a chamber so as to measure a positional moving amount and an unrestored moving amount of each of the components due to the folding and the unfolding.

In FIGS. 9A and 10A, the electronic device 1000 is tested as an example, but is not limited thereto. For example, the test may be performed only with some components of the electronic device 1000, or the test may be performed with a product designed similarly to the electronic device 1000.

Since the adhesive layers and the tapes have a lot of slip due to shear under high-temperature environments, the test may be performed in a state in which the adhesive layers and the tapes are disposed in the chamber having a high temperature so as to measure the positional moving amount and the unrestored moving amount of each of the components due to the folding and the unfolding. The high temperature may be, for example, about 60 degrees Celsius, but is not limited thereto.

Referring to FIGS. 9A and 9B, when the electronic device 1000 is folded, the shapes of components, each of which has a relatively low modulus, may be deformed. For example, the shapes of the second adhesive layer 1020, the first adhesive layer 1010, the third adhesive layer 1030, the first cushion adhesive layer 510, and the second cushion adhesive layer 540 may be deformed. For example, side surfaces of the second adhesive layer 1020, the first adhesive layer 1010, the third adhesive layer 1030, the first cushion adhesive layer 510, and the second cushion adhesive layer 540, which are deformed, may be inclined in third direction DR3.

In FIG. 9B, the positions of the components before being folded are shown by dotted lines, and the positions of the components in the fully folded state are shown by solid lines. The positions of the components disposed on the plate 610 with respect to the plate 610 may be changed. The plate 610 may be SUS304 or a rigid material. Therefore, the positions of the components disposed on the plate 610 with respect to the plate 610 may be deformed in a direction crossing the folding axis FX (see FIG. 1A), for example, the first direction DR1.

According to an embodiment of the inventive concepts, in the state in which the electronic device 1000 is fully folded, the positions of the first hole 101H and the second light blocking pattern 362 may be designed so that the camera module 2100 does not collide with the sidewalls constituting the first hole 101H, and the second light blocking pattern 362 does not cover the viewing angle area 2100AV of the camera module 2100. A detailed description related to this configuration will be described later.

Referring to FIGS. 10A and 10B, even when the electronic device 1000 is unfolded again, the shapes of the components may not be partially restored. In FIG. 10B, the positions of the components before being folded are shown by dotted lines, and the positions of the components when being unfolded again after being fully folded are shown by solid lines.

According to an embodiment of the inventive concepts, when the electronic device 1000 is unfolded again, the positions of the first hole 101H and the second light blocking pattern 362 may be designed in consideration of the positions of the components that are not restored. A detailed description related to this configuration will be described later.

FIG. 11 is a cross-sectional view for explaining design dimensions of the electronic device according to an embodiment of the inventive concepts.

Referring to FIGS. 9A, 9B, 10A, 10B, and 11, a first design object FD1, a second design object FD2, a third design object FD3, a fourth design object FD4, a fifth design object FD5, a sixth design object FD6, a seventh design object FD7, and an eighth design object FD8 are illustrated as an example.

The second light blocking pattern 362 may have a ring shape having an inner diameter 3621 and an outer diameter 3620 surrounding the inner diameter 3621. The first design target FD1 is a distance between an edge 100E of the display panel 100 and the inner diameter 3621 of the second light blocking pattern 362. The second design target FD2 is a distance between the edge 100E of the display panel 100 and the outer diameter 3620 of the second light blocking pattern 362.

The third design target FD3 is a distance between the outer diameter 3620 of the second light blocking pattern 362 and the active area 100A of the display panel 100. The fourth design target FD4 is a distance between the inner diameter 3621 of the second light blocking pattern 362 and the viewing angle area 2100AV. The fifth design target FD5 is a distance between the edge 100E of the display panel 100 and the camera module 2100. The sixth design object FD6 is a distance between the edge 100E of the display panel 100 and the cushion member 500. The seventh design object FD7 is a distance between the edge 100E of the display panel 100 and the plate 610. The eighth design object FD8 is a distance between the plate 610 and the step compensation member 800.

All the above-described distances may be distances in a direction parallel to the first direction DR1. Also, the above-described distances may correspond to a distance between the two components when the electronic device 1000 is viewed on the plane.

A numerical value of each of the first design object FD1, the second design object FD2, the third design object FD3, the fourth design object FD4, the fifth design object FD5, the sixth design object FD6, the seventh design object FD7, and the eighth design object FD8 may be designed in consideration of the component tolerances, the equipment tolerances, the characteristic tolerances, and the folding tolerances.

For example, the component tolerances may include a tolerance generated in the process of printing the second light blocking pattern 362, a tolerance with respect to the size of the second light blocking pattern 362, a tolerance with respect to the position of the second light blocking pattern 362, a tolerance with respect to a position of an alignment mark of the panel 100, a tolerance with respect to an outer periphery of the cushion member 500, a tolerance with respect to the size of the second hole portion 101H2 of the cushion member 500, a tolerance with respect to the position of the second hole portion 101H2 of the cushion member 500, a tolerance with respect to an outer periphery of the plate 610, a tolerance with respect to the size of the third hole portion 101H3 of the plate 610, and a tolerance with respect to the position of the third hole portion 101H3 of the plate 610.

For example, the equipment tolerances may include a tolerance generated in the process of cutting the first hole portion 101H1 by using the laser, a tolerance generated in the process of laminating the upper member 300 to the configuration including the display panel 100, a tolerance generated in the process of laminating the cushion member 500 to the configuration including the display panel 100, and a tolerance generated in the process of laminating the cushion member 500 to the plate 610. The configuration including the display panel 100 may refer to the components from the second adhesive layer 1020 to the lower protective film 400.

For example, the characteristic tolerances may be tolerances due to high-temperature shrinkage of the anti-reflection member 200 and the second adhesive layer 1020.

For example, the folding tolerances may be tolerances generated due to the folding operation of the electronic device 1000 and may include a moving amount DS1 of the display panel 100, which is measured with respect to the plate 610 in the folded state, an unrestored moving amount DS2 of the second light blocking pattern 362, an unrestored moving amount DS3 between the anti-reflection member 200 and the layer including the second light blocking pattern 362, and an unrestored moving amount DS4 between the display panel 100 and the layer including the second light blocking pattern 362.

In Table 1 below, component tolerance data and equipment tolerance data for determining the dimensions of each of the first design object FD1, the second design object FD2, the fourth design object FD4, and the fifth design object FD5 were shown.

TABLE 1

| Tolerance type | Tolerance (mm) |
| --- | --- |
| Tolerances generated in process of printing second light blocking pattern 362 | 0.05 |
| Tolerance with respect to size of second light blocking pattern 362 | 0.04 |
| Tolerance with respect to position of second light blocking pattern 362 | 0.1 |
| Tolerance with respect to position of alignment mark of display panel 100 | 0.01 |
| Tolerance generated in process of cutting first hole portion 101H1 by using laser | 0.09 |
| Tolerances generated in process of laminating upper member 300 to configuration including display panel 100 | 0.125 |
| First RSS (Component tolerance + Equipment tolerance) | 0.195 |

The first RSS (Root Sum of Squares) value may be calculated by Equation 1 below.

$$3* \quad \sqrt{(0.05/3)^2 + (0.04/3)^2 + (0.1/3)^2 + (0.01/3)^2 + (0.09/3)^2 + (0.125/3)^2}$$

Equation 1

The dimension of the first design object FD1 may be determined based on the sum of the first RSS values and the first other tolerances. The first other tolerances may include a tolerance generated by the residual adhesive of the second adhesive layer 1020 and a tolerance generated when the components of the electronic device 1000 are not restored. Specifically, the tolerance generated due to the unrestoration may be an unrestored moving amount DS4 (see FIG. 10B) between the display panel 100 and the layer including the second light blocking pattern 362. For example, the tolerance generated due to the unrestoration may be an unrestored movement amount DS4 (see FIG. 10B) between the display panel 100 and the upper member 300. The tolerance due to the residual adhesive of the adhesive layer may be about 0.05 mm, and the unrestored moving amount DS4 (see FIG. 10B) may be about 0.094 mm.

When the first other tolerances are added to the first RSS value, the tolerance may be about 0.339 mm. Since the viewing angle area 2100AV and the second light blocking pattern 362 should not overlap each other, a smaller design dimension of the first design target FD1 than the calculated value may be advantageous. Therefore, the first design object FD1 may be designed with a numerical value less than the calculated value. For example, the first design object FD1 may be designed with a tolerance of about 0.287 mm.

The dimension of the second design object FD2 may be determined based on the sum of the first RSS value and the second other tolerances. The second other tolerances may include a tolerance due to high-temperature shrinkage of the anti-reflection member 200 and the second adhesive layer 1020 and a tolerance generated when the components of the electronic device 1000 are not restored. Specifically, the second other tolerances may include an unrestored moving amount between the anti-reflection member 200 and the layer including the second light blocking pattern 362 DS3 (see FIG. 10B). For example, the second other tolerances may include an unrestored moving amount DS3 between the anti-reflection member 200 and the upper member 300. The tolerance due to the high-temperature shrinkage of the adhesive layer may be about 0.03 mm, and the unrestored moving amount DS3 (see FIG. 10B) may be about 0.014 mm.

If the second other tolerances are added to the first RSS value, the tolerance may be about 0.241 mm. The second design object FD2 may be designed with calculated value. Therefore, the second design object FD2 may be designed with a tolerance of about 0.241 mm.

The second light blocking pattern 362 may be provided to prevent light blurring from occurring in the camera module 2100. Therefore, the dimension of the first design object FD1 may be designed to be greater than that of the second design object FD2.

The dimension of the fourth design object FD4 may be designed based on the sum of the first RSS value and the fourth other tolerance. The fourth other tolerance may be the unrestored moving amount DS2 (see FIG. 10B) of the second light blocking pattern 362. The unrestored moving amount DS2 (see FIG. 10B) may be about 0.051 mm.

When the fourth other tolerance is added to the first RSS value, the tolerance may be about 0.246 mm. The fourth design object FD4 may be selected within a predetermined range based on the calculated value. For example, the fourth design object FD4 may be designed with a tolerance of about 0.245 mm.

The dimension of the fifth design object FD5 may be designed based on the sum of the first RSS value and the fifth other tolerance. The fifth other tolerance may be a moving amount DS1 of the display panel 100, which is measured with respect to the plate 610. For example, a moving amount DS1 of the display panel 100 may be measured by a distance DS1a between the plate 610 before being folded and the edge 100E of the display panel 100 and a distance DS1b between the plate 610 in the fully folded state and the edge 100E of the display panel 100.

When the fifth other tolerance is added to the first RSS value, the tolerance may be about 0.320 mm. The fifth design object FD5 may be designed based on the calculated value. In consideration of the case in which the top surface 2100U of the camera module 2100 is disposed up to the first hole portion 101H1, the fifth design object FD5 may be designed more sufficiently than the calculated value so that the display panel 100 and the camera module 2100 do not collide with each other. For example, the fifth design object FD5 may be designed with a tolerance of about 0.483 mm.

Table 2 below shows component tolerance data and equipment tolerance data for determining the dimensions of the third design object FD3.

TABLE 2

| Tolerance type | Tolerance (mm) |
| --- | --- |
| Tolerances generated in process of printing second light blocking pattern 362 | 0.05 |
| Tolerance with respect to size of second light blocking pattern 362 | 0.04 |
| Tolerance with respect to position of second light blocking pattern 362 | 0.1 |
| Tolerance with respect to position of alignment mark of display panel 100 | 0.01 |
| Tolerances generated in process of laminating upper member 300 to the configuration including display panel 100 | 0.125 |
| Second RSS (Component tolerance + Equipment tolerance) | 0.173 |

The second RSS value may be calculated by Equation 2 below.

$$3 * \sqrt{(0.05/3)^2 + (0.04/3)^2 + (0.1/3)^2 + (0.01/3)^2 + (0.125/3)^2} \quad \text{Equation 2}$$

The dimension of the third design object FD3 may be determined based on the sum of the second RSS value and the third other tolerance. The third other tolerance may be an unrestored moving amount DS4 (see FIG. 10B) between the display panel 100 and the layer including the second light blocking pattern 362. For example, the tolerance generated due to the unrestoration may be an unrestored movement amount DS4 (see FIG. 10B) between the display panel 100 and the upper member 300. The unrestored moving amount DS4 (see FIG. 10B) may be about 0.094 mm.

When the third other tolerance is added to the second RSS value, the tolerance may be about 0.267 mm. As the design value of the third design object FD3 decreases, the area other than the active area 100A may decrease. Thus, the design dimension of the third design object FD3 may be designed with a value less than the calculated value. For example, the third design object FD3 may be designed with a tolerance of about 0.230 mm.

Table 3 below shows component tolerance data and equipment tolerance data for determining the dimensions of the sixth design object FD6.

TABLE 3

| Tolerance type | Tolerance (mm) |
| --- | --- |
| Tolerance with respect to outer periphery of cushion member 500 | 0.075 |
| Tolerance with respect to size of second hole portion 101H2 of cushion member 500 | 0.05 |
| Tolerance with respect to position of second hole portion 101H2 of cushion member 500 | 0.15 |
| Tolerance with respect to position of alignment mark of display panel 100 | 0.01 |
| Tolerance with respect to outer periphery of plate 610 | 0.06 |
| Tolerance generated in process of cutting first hole portion 101H1 by using laser | 0.09 |
| Tolerances generated in process of laminating cushion member 500 to configuration including display panel 100 | 0.125 |
| Tolerance generated in process of laminating cushion member 500 to plate 610 | 0.150 |
| Third RSS (Component tolerance + Equipment tolerance) | 0.284 |

The third RSS value may be calculated by Equation 3 below.

$$3 * \sqrt{(0.075/3)^2 + (0.05/3)^2 + (0.15/3)^2 + (0.01/3)^2 + (0.006/3)^2 + (0.09/3)^2 + (0.125/3)^2 + (0.15/3)^2} \quad \text{Equation 3}$$

The dimension of the sixth design object FD6 may be designed based on the third RSS value. For example, the sixth design object FD6 may be designed with a tolerance of about 0.3 mm.

Table 4 below shows component tolerance data and equipment tolerance data for determining the dimensions of the seventh design object FD7.

TABLE 4

| Tolerance type | Tolerance (mm) |
| --- | --- |
| Tolerance with respect to outer periphery of plate 610 | 0.06 |
| Tolerance with respect to size of third hole portion 101H3 of plate 610 | 0.05 |
| Tolerance with respect to position of third hole portion 101H3 of plate 610 | 0.1 |
| Tolerance with respect to position of alignment mark of display panel 100 | 0.01 |
| Tolerance generated in process of cutting first hole portion 101H1 by using laser | 0.09 |
| Tolerance generated in process of laminating cushion member 500 to plate 610 | 0.150 |
| Fourth RSS (Component tolerance + Equipment tolerance) | 0.216 |

The fourth RSS value may be calculated by Equation 4 below.

$$3 * \sqrt{(0.006/3)^2 + (0.05/3)^2 + (0.1/3)^2 + (0.01/3)^2 + (0.09/3)^2 + (0.15/3)^2} \quad \text{Equation 4}$$

The dimension of the seventh design object FD7 may be designed based on the fourth RSS value. For example, the seventh design object FD7 may be designed with a tolerance of about 0.22 mm. The eighth design object FD8 may be designed with a tolerance of about 0.5 mm.

Referring to FIGS. 6, 7, and 11, a first width WT1 of the first hole portion 101H1, a second width WT2 of the second hole portion 101H2, and a third with WT3 of the third hole portion 101H3 may be different from each other. For example, the second width WT2 may be greater than the first width WT1. For example, the second width WT2 may correspond to a value obtained by adding the dimension of the sixth design object FD6 twice to the first width WT1. Thus, the difference between the first width WT1 and the second width WT2 may be about 0.6 mm. The difference between the second width WT2 and the third width WT3 may correspond to a value obtained by adding the dimension of the seventh design object FD7 twice. Thus, the difference between the second width WT2 and the third width WT3 may be about 0.44 mm.

The positional relationship between the second light blocking pattern 362 and the first sidewall SW1 may be determined in consideration of the dimension of the first design object FD1 and the dimension of the second design object FD2. For example, the second light blocking pattern 362 may have a width of about 0.214 mm in a direction toward the active area 100A with respect to the first sidewall SW1, and the second light blocking pattern 362 may have a width of about 0.287 mm in a direction toward the viewing angle area 2100AV with respect to the first sidewall SW1.

According to the inventive concepts, the first hole 101H defined in the electronic device 1000 may include at least two or more hole portions 101H1, 101H2, and 101H3. The hole portions 101H1, 101H2, and 101H3 may have sizes different from each other in consideration of the component tolerances, the equipment tolerances, and the folding tolerances. Accordingly, even if the first hole 101H is provided in the foldable electronic device 1000, the interference between the inner sidewall of the first hole 101H and the camera module 2100 may not occur. Also, the second light blocking pattern 362 disposed corresponding to the position of the first hole 101H may also be disposed in consideration of the folding tolerances. Accordingly, the possibility that the second light blocking pattern 362 covers the active area 100A of the display panel 100 or the second light blocking pattern 362 covers a viewing angle area 2100AV of the camera module 2100 may be reduced.

According to the inventive concepts, a portion of the plurality of electronic modules may overlap the active area of the electronic device, and the other portion of the plurality of electronic modules may be surrounded by the active area. Therefore, it is unnecessary to separately provide the area, on which the plurality of electronic modules are arranged, to the peripheral area. As a result, the area ratio of the active area to the front surface of the electronic device may increase.

According to the inventive concepts, the hole defined in the electronic device may include at least two or more hole portions. The sizes of the hole portions may be different from each other in consideration of the component tolerance, the equipment tolerance, and the folding tolerance. Therefore, even if the hole is provided in the foldable electronic device, the interference between the sidewall within the hole and the electronic module inserted into the hole may not occur. In addition, the light blocking pattern disposed to correspond to the position of the hole may also be designed in consideration of the folding tolerance. Therefore, the possibility that the light blocking pattern covers the active area of the display panel or covers the viewing angle area of the electronic module may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a display panel;
a cushion member disposed below the display panel;
an electronic module inserted into a hole defined by the display panel and the cushion member; and
a light blocking pattern disposed to surround the electronic module with the display panel disposed between the light blocking pattern and the electronic module,
wherein the electronic module is spaced apart from a sidewall configured to define the hole in a first state in which the display panel and the cushion member are folded and in a second state in which the display panel and the cushion member are unfolded.

2. The electronic device of claim 1, wherein the light blocking pattern is spaced apart from a viewing angle area of the electronic module in the first state and the second state.

3. The electronic device of claim 1, wherein the hole comprises a first hole portion defined in the display panel and a second hole portion defined in the cushion member, and
the second hole portion has a width greater than that of the first hole portion.

4. The electronic device of claim 3, wherein, when viewed on a plane, the light blocking pattern overlaps a sidewall of the display panel defining the first hole portion.

5. The electronic device of claim 3, wherein, when viewed on a plane, a sidewall of the cushion member defining the second hole portion is disposed to surround the light blocking pattern.

6. The electronic device of claim 3, wherein a sidewall of the cushion member defining the second hole portion does not overlap the light blocking pattern.

7. The electronic device of claim 3, further comprising a plate disposed below the cushion member,
wherein a third hole portion having a width greater than that of the first hole portion and less than that of the second hole portion is defined in the plate, and
the first hole portion, the second hole portion, and the third hole portion overlap each other to define the hole.

8. The electronic device of claim 3, wherein the light blocking pattern has a ring shape having an inner diameter and an outer diameter surrounding the inner diameter, and
the inner diameter is less than a diameter of the first hole portion, and the outer diameter is greater than the diameter of the first hole portion.

9. The electronic device of claim 8, wherein a first distance between the inner diameter and an edge of the display panel defining the first hole portion is different from a second distance between the outer diameter and the edge of the display panel defining the first hole portion.

10. The electronic device of claim 9, wherein the first distance is greater than the second distance.

11. The electronic device of claim 9, wherein each of the first distance and the second distance is determined based on component tolerances, equipment tolerances, and folding tolerances.

12. The electronic device of claim 1, further comprising:
an impact absorbing layer disposed on the display panel; and
a hard coating layer disposed between the impact absorbing layer and the display panel,
wherein a portion of the hard coating layer is exposed through the hole.

13. The electronic device of claim 12, wherein the impact absorbing layer comprises a stretched film of which an optical axis is controlled.

14. The electronic device of claim 1, further comprising:
a window disposed on the light blocking pattern; and
a protective layer disposed on the window,
wherein a sidewall of the protective layer further protrudes from a sidewall of the window.

15. The electronic device of claim 14, wherein a distance between the window and the electronic module is about 60% or more of total sum of thicknesses of components, each of which has a modulus equal to or less than a reference modulus, among components in which the hole is defined.

16. The electronic device of claim 15, wherein the reference modulus is about 50 M Pa or less.

17. An electronic device comprising:
a display panel;
an electronic module disposed to overlap a hole defined in the display panel; and
a light blocking pattern having a ring shape disposed on the electronic module with the display panel therebetween and having an inner diameter and an outer diameter surrounding the inner diameter,
wherein a first distance between the inner diameter and an edge of the display panel defining the hole is greater than a second distance between the outer diameter and the edge of the display panel defining the hole.

18. The electronic device of claim 17, wherein each of the first distance and the second distance is determined based on component tolerances, equipment tolerances, and folding tolerances.

19. The electronic device of claim 17, wherein, in a first state, in which the display panel is folded, and a second state, in which the display panel is unfolded, the electronic module is spaced apart from the edge of the display panel defining the hole.

* * * * *